United States Patent
Sanders et al.

(10) Patent No.: US 10,469,997 B2
(45) Date of Patent: Nov. 5, 2019

(54) DETECTING A WIRELESS SIGNAL BASED ON CONTEXT

(71) Applicant: Microsoft Technology Licensing, LLC, Redmond, WA (US)

(72) Inventors: John R. Sanders, Seattle, WA (US); Vlad Riscutia, Redmond, WA (US); Andrew J. Peacock, Seattle, WA (US); David M. Gray, Bellevue, WA (US); David J. Brennan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 478 days.

(21) Appl. No.: 15/054,163

(22) Filed: Feb. 26, 2016

(65) Prior Publication Data
US 2017/0251340 A1    Aug. 31, 2017

(51) Int. Cl.
| | |
|---|---|
| *H04H 20/71* | (2008.01) |
| *H04W 4/06* | (2009.01) |
| *H04W 4/02* | (2018.01) |
| *H04W 48/16* | (2009.01) |
| *H04W 8/00* | (2009.01) |
| *H04W 84/12* | (2009.01) |
| *G06Q 10/10* | (2012.01) |

(52) U.S. Cl.
CPC ............ *H04W 4/06* (2013.01); *H04W 4/02* (2013.01); *H04W 8/005* (2013.01); *H04W 48/16* (2013.01); *G06Q 10/109* (2013.01); *H04W 84/12* (2013.01)

(58) Field of Classification Search
CPC ............ H04W 48/16; H04W 52/0229; H04W 52/0219; H04W 52/0225; H04W 40/244; H04W 84/005; H04W 4/02
See application file for complete search history.

(56) References Cited

U.S. PATENT DOCUMENTS

| | | |
|---|---|---|
| 6,961,858 B2 | 11/2005 | Fransdonk |
| 7,016,877 B1 | 3/2006 | Steele et al. |

(Continued)

FOREIGN PATENT DOCUMENTS

| | | |
|---|---|---|
| AU | 2012101222 A4 | 9/2012 |
| CA | 2605477 A1 | 10/2006 |

(Continued)

OTHER PUBLICATIONS

PCT Search Report and Written Opinion for PCT Application No. PCT/US2017/018026, dated Apr. 19, 2017, 15 pages.

(Continued)

*Primary Examiner* — Abdelnabi O Musa
(74) *Attorney, Agent, or Firm* — Rainier Patents, P.S.

(57) ABSTRACT

A technique is described for efficiently detecting a wireless beacon signal emitted from a beacon-emitting mechanism, and thereby reducing consumption of power. The technique operates by selectively increasing detection activity when a detection event is likely to occur, and decreasing it otherwise. The technique leverages calendar information as one factor in determining when a detection event is likely to occur. The technique can also vary the detection activity based on location information (identifying the location of a user) and/or motion information (describing the motion of the user).

21 Claims, 10 Drawing Sheets

(56) References Cited

U.S. PATENT DOCUMENTS

| | | |
|---|---|---|
| 7,035,650 B1 | 4/2006 | Moskowitz et al. |
| 7,069,319 B2 | 6/2006 | Zellner et al. |
| 7,098,787 B2 | 8/2006 | Miller |
| 7,375,634 B2 | 5/2008 | Sprague |
| 7,460,891 B2 | 12/2008 | Koch et al. |
| 7,600,679 B2 | 10/2009 | Kshirsagar et al. |
| 7,653,017 B2 | 1/2010 | Huylebroeck |
| 7,751,829 B2 | 7/2010 | Masuoka et al. |
| 7,991,843 B2 | 8/2011 | Guo et al. |
| 8,040,219 B2 | 10/2011 | Haartsen et al. |
| 8,259,719 B2 | 9/2012 | Sharma et al. |
| 8,284,061 B1 | 10/2012 | Dione |
| 8,452,353 B2 | 5/2013 | Crawford |
| 8,618,984 B2 | 12/2013 | Lin et al. |
| 8,624,970 B2 | 1/2014 | Krobath |
| 8,670,325 B1* | 3/2014 | Hui ............... H04L 45/121 370/238 |
| 8,711,176 B2 | 4/2014 | Douris et al. |
| 8,744,750 B2 | 6/2014 | Gupta et al. |
| 8,781,716 B1 | 7/2014 | Wenneman et al. |
| 8,798,606 B2 | 8/2014 | Day |
| 8,842,815 B2 | 9/2014 | Connelly et al. |
| 8,847,754 B2 | 9/2014 | Buchheim et al. |
| 8,879,363 B2 | 11/2014 | Yonekura |
| 8,958,854 B1 | 2/2015 | Morley et al. |
| 8,959,368 B2 | 2/2015 | Lee et al. |
| 9,100,435 B2 | 8/2015 | Hamilton, II et al. |
| 9,146,601 B2 | 9/2015 | Springfield et al. |
| 9,173,165 B2 | 10/2015 | Stark et al. |
| 9,185,167 B2 | 11/2015 | Connolly et al. |
| 9,195,765 B2 | 11/2015 | Russell et al. |
| 9,202,245 B2 | 12/2015 | Kostka et al. |
| 9,226,117 B2 | 12/2015 | Vos et al. |
| 9,538,459 B1* | 1/2017 | Shirriff ............... H04W 48/16 |
| 9,596,637 B2* | 3/2017 | Hansen ............... H04W 36/30 |
| 9,904,885 B2* | 2/2018 | Sengstaken, Jr. .. G06K 19/0716 |
| 9,998,853 B2 | 6/2018 | Brennan et al. |
| 2002/0176388 A1 | 11/2002 | Rankin et al. |
| 2003/0078980 A1 | 4/2003 | Carstens et al. |
| 2003/0119504 A1 | 6/2003 | Rankin |
| 2003/0169885 A1 | 9/2003 | Rinaldi |
| 2003/0181205 A1 | 9/2003 | Yiu et al. |
| 2004/0042434 A1* | 3/2004 | Kennedy ............... H04W 84/18 370/338 |
| 2004/0123106 A1 | 6/2004 | D'Angelo et al. |
| 2004/0192207 A1 | 9/2004 | Ketola |
| 2004/0198425 A1 | 10/2004 | Mellone et al. |
| 2006/0287813 A1 | 12/2006 | Quigley |
| 2007/0030152 A1 | 2/2007 | Sprague |
| 2008/0182548 A1 | 7/2008 | Pattison et al. |
| 2008/0280624 A1 | 11/2008 | Wrappe |
| 2009/0234857 A1 | 9/2009 | Barault et al. |
| 2009/0299857 A1 | 12/2009 | Brubaker |
| 2010/0004005 A1* | 1/2010 | Pereira ............... H04W 4/02 455/457 |
| 2010/0013704 A1 | 1/2010 | Coutel et al. |
| 2010/0077484 A1 | 3/2010 | Paretti et al. |
| 2010/0268603 A1 | 10/2010 | Nolet et al. |
| 2011/0153773 A1 | 6/2011 | Vandwalle et al. |
| 2012/0115512 A1 | 5/2012 | Grainger et al. |
| 2013/0064142 A1 | 3/2013 | Bhow |
| 2013/0065584 A1 | 3/2013 | Lyon et al. |
| 2013/0090134 A1* | 4/2013 | Heshmati ............ H04W 52/0245 455/456.3 |
| 2013/0183924 A1 | 7/2013 | Saigh et al. |
| 2013/0282438 A1 | 10/2013 | Hunter et al. |
| 2013/0282538 A1 | 10/2013 | Hunter et al. |
| 2013/0297422 A1 | 11/2013 | Hunter et al. |
| 2013/0345961 A1 | 12/2013 | Leader et al. |
| 2014/0064500 A1 | 3/2014 | Lee |
| 2014/0085179 A1 | 3/2014 | Krig et al. |
| 2014/0089143 A1 | 3/2014 | Dione |
| 2014/0162601 A1 | 6/2014 | Kim et al. |
| 2014/0189804 A1 | 7/2014 | Lehmann et al. |
| 2014/0309806 A1 | 10/2014 | Ricci |
| 2014/0364100 A1 | 12/2014 | Marti et al. |
| 2014/0368161 A1 | 12/2014 | Leabman et al. |
| 2015/0031388 A1 | 1/2015 | Chatterjee et al. |
| 2015/0045068 A1 | 2/2015 | Softer et al. |
| 2015/0050977 A1 | 2/2015 | Omar |
| 2015/0084838 A1 | 3/2015 | Chang et al. |
| 2015/0088603 A1 | 3/2015 | Romero et al. |
| 2015/0100326 A1 | 4/2015 | Kowalkiewicz et al. |
| 2015/0110259 A1 | 4/2015 | Kaye et al. |
| 2015/0111552 A1 | 4/2015 | Kaye et al. |
| 2015/0123770 A1 | 5/2015 | Jones |
| 2015/0133173 A1 | 5/2015 | Edge et al. |
| 2015/0181371 A1 | 6/2015 | Steiner |
| 2015/0181531 A1 | 6/2015 | Zajac |
| 2015/0219757 A1 | 8/2015 | Boelter et al. |
| 2015/0278867 A1 | 10/2015 | Lerman et al. |
| 2015/0289207 A1 | 10/2015 | Kubo et al. |
| 2015/0341901 A1 | 11/2015 | Ryu et al. |
| 2015/0350820 A1 | 12/2015 | Son et al. |
| 2015/0358593 A1 | 12/2015 | Marshall et al. |
| 2015/0365486 A1 | 12/2015 | Kotecha et al. |
| 2016/0003637 A1 | 1/2016 | Andersen |
| 2016/0050564 A1* | 2/2016 | Niewczas ............ H04W 12/06 455/411 |
| 2016/0066156 A1 | 3/2016 | Le grand et al. |
| 2016/0092160 A1 | 3/2016 | Graff et al. |
| 2016/0095063 A1* | 3/2016 | Vigier ............... H04W 52/0229 455/574 |
| 2016/0100282 A1 | 4/2016 | Pounds et al. |
| 2016/0148164 A1 | 5/2016 | Luk et al. |
| 2016/0156638 A1 | 6/2016 | Somani et al. |
| 2016/0205548 A1 | 7/2016 | Lundqvist et al. |
| 2016/0260296 A1* | 9/2016 | Shirriff ................ G08B 5/22 |
| 2016/0316362 A1 | 10/2016 | Ding |
| 2017/0094445 A1 | 3/2017 | Shanmugam et al. |
| 2017/0249714 A1 | 8/2017 | Van hoof et al. |
| 2017/0289794 A1 | 10/2017 | Gray et al. |

FOREIGN PATENT DOCUMENTS

| | | |
|---|---|---|
| CN | 102474507 A | 5/2012 |
| EP | 2449502 A1 | 5/2012 |
| EP | 2456238 A1 | 5/2012 |
| WO | 2009070415 A1 | 6/2009 |
| WO | 2013/009815 A2 | 1/2013 |
| WO | 2015/049660 A1 | 4/2015 |
| WO | 2015/104199 A1 | 7/2015 |
| WO | 2015101298 A1 | 7/2015 |
| WO | 2015192895 A1 | 12/2015 |

OTHER PUBLICATIONS

Pering, et al., "CoolSpots: Reducing the Power Consumption of Wireless Mobile Devices with Multiple Radio Interfaces," in Proceedings of the 4th International Conference on Mobile Systems, Applications and Services, Jun. 19, 2006, 13 pages.

Kray et al., "Towards a location model for indoor navigation support through public displays and mobile devices", Proceedings of the Conference on Mobile Interaction with the Real World, 2008, 5 pages.

Leddy, Patrick, "10 Things about Bluetooth Beacons You Need to Know", published Jul. 24, 2015, available at <<http://academy.pulsatehq.com/bluetooth-beacons>>, 21 pages.

Lee, Jason, "China's Li Ning to team up with Xiaomi on 'smart' running shoes", available at <<http://www.reuters.com/article/2015/03/16/us-li-ning-xiaomi-idUSKBN0MC0WZ20150316>>, Reuters, Mar. 16, 2015, 3 pages.

Lijding et al., "Smart Signs: Showing the way in Smart Surroundings", available at <<http://doc.utwente.nl/65597/1/Lijding-SmartSigns.pdf>>, Technical Report No. TR-CTIT-06-20, University of Twente, Enschede, Netherlands, 2006, 18 pages.

Lomas, Natasha, "Fin, a Remote-Control Bluetooth Ring, Finally Launches as Neyya", available at <<http://techcrunch.com/2015/11/17/neyya/#.szd1sxr:294R>>, TechCrunch, Nov. 17, 2015, 12 pages.

(56) References Cited

OTHER PUBLICATIONS

Murell, Dan, "The Connected Office: What Does IoT Mean for the Workplace?", available at <<http://www.mutualmobile.com/posts/the-connected-office-what-does-iot-mean-for-the-workplace>>, published Nov. 3, 2015, 3 pages.
Schougaard et al., "Indoor Pedestrian Navigation Based on Hybrid Route Planning and Location Modeling", Proceedings of the 10th International Conference on Pervasive Computing, 2012, 18 pages.
Sawers, Paul, "Lenovo demos new smart shoes with a screen that displays your mood", available at <<http://venturebeat.com/2015/05/28/lenovo-demos-new-smart-shoes-with-a-screen-that-displays-your-mood/>>, VentureBeat, May 28, 2015, 5 pages.
Sharma et al., "Direction Finding Signage System using RFID for Healthcare Applications", Proceedings of the International Conference on BioMedical Engineering and Informatics, vol. 1, 2008, 5 pages.
Supeala, Doru, "Wayfinder: Indoors Routing Guided by Beacons", published Nov. 25, 2015, available at <<http://www.onyxbeacon.com/wayfinder-indoors-routing-guided-by-beacons/>>, 8 pages.
Wood, Becki, "Latest News, Views and Insights from the Purple WiFi Team", published Dec. 8, 2014, available at <<http://www.purplewifi.net/wifi-or-beacons-for-location-based-services/>>, 8 pages.
International Search Report and Written Opinion dated Apr. 6, 2017 from PCT Patent Application No. PCT/US2017/018027, 14 pages.
Non-Final Office Action dated Mar. 6, 2017 from U.S. Appl. No. 15/089,327, 19 pages.
Applicant-Initiated Interview Summary dated Apr. 19, 2017 from U.S. Appl. No. 15/089,327, 3 pages.
"10 Awesome Things You Can do today with iBeacons", published Dec. 2013, available at<<http://blog.twocanoes.com/post/68861362715/10-awesome-things-you-can-do-today-with-ibeacons>>, 19 pages.
"iBeacon for the Enterprise: Facilitating a Rich Productive Workplace", published Feb. 1, 2015, available at<<http://apsima.com/blog/ibeacon-for-the-enterprise/>>, 3 pages.
"Turning Your Mobile Apps into One Context-Aware Data Collection Hub", published Feb. 9, 2015, available at <<http://www.beaconcube.com/>, 8 pages.
"A smarter way to run", available at <<http://www.sensoriafitness.com/>>, product page, Sensoria, Inc., Redmond, Washington, accessed on Feb. 15, 2016, 8 pages.
"Activity tracker", available at <<https://en.wikipedia.org/wiki/Activity_tracker>>, Wikipedia entry, accessed on Feb. 15, 2016, 6 pages.
"Biometric shirts for performance improvement and sleep tracking", available at <<http://www.hexoskin.com/>>, product page, Carre Technologies, Inc. (Hexoskin), Montreal, Canada, accessed on Feb. 15, 2016, 4 pages.
"Eddystone (Google)", available at <<https://en.wikipedia.org/wiki/Eddystone_%28Google%29 >>, Wikipedia entry, accessed on Feb. 15, 2016, 2 pages.
"E-textiles", available at <<https://en.wikipedia.org/wiki/E-textiles>>, Wikipedia entry, accessed on Feb. 15, 2016, 5 pages.
"Floor Sensor Analytics, smartest way to measure foot traffic", available at <<http://www.scanalyticsinc.com/>>, product page, Scanalytics, Inc., Milwaukee, Wisconsin, accessed on Feb. 15, 2016, 5 pages.
"iBeacon", available at <<https://en.wikipedia.org/wiki/IBeacon>>, Wikipedia entry, accessed on Feb. 15, 2016, 7 pages.
"Introducing the Nymi Band™", available at <<https://www.nymi.com/the-nymi-band/>>, product page, Nymi, Inc., Toronto, Canada, accessed on Feb. 15, 2016, 10 pages.
"Lechal features", available at <<http://www.lechal.com/features.html>>, product page, Ucere Technologies Pvt. Ltd, Telangana, India, retrieved on Feb. 15, 2016, 9 pages.
"Make your life simpler", available at <<http://www.endlessid.com/>>, product page, EndlessID LLC, Hallandale Beach, Florida, accessed on Feb. 15, 2016, 1 page.

"Meet Everykey, the Master Key to your Phone, Laptop, Website Accounts, and more", available at <<https://everykey.com/>>, product page, Everykey, Inc., Cleveland, Ohio, accessed on Feb. 15, 2016, 13 pages.
"SensFloor®—large-area sensor system", available at <<http://www.future-shape.com/en/technologies/23>>, product page, Future Shape, Höhenkirchen-Siegertsbrunn, Germany, accessed on Feb. 15, 2016, 4 pages.
"Sit smart for a healthy body and mind", available at <<http://darma.co/>>, product page, Darma, Inc., Palo Alto, California, accessed on Feb. 15, 2016, 5 pages.
"The Isowalk SmartCane: Clinical Visibility for Gait", available at <<http://isowalk.com/>>, product page, Isowalk, Inc., Los Angeles, California, accessed on Feb. 15, 2016, 3 pages.
"The world's smallest input device", available at << http://logbar.jp/ring/en/>>, product page, Logbar Inc., Tokyo, Japan, accessed on Feb. 15, 2016, 3 pages.
"Under Armour Launches a Suite of Connected Fitness Products, Changing the Way Athletes Live", available at <<http://www.prnewswire.com/news-releases/under-armour-launches-a-suite-of-connected-fitness-products-changing-the-way-athletes-live-300199284.html>>, PR Newswire, Jan. 5, 2016, 3 pages.
"We Are Oak", available at <<http://www.oaklabs.is/>>, product page, Oak Lab, Inc., New York, New York, accessed on Feb. 15, 2016, 6 pages.
"Wearable technology", available at <<https://en.wikipedia.org/wiki/Wearable_technology>>, Wikipedia entry, accessed on Feb. 15, 2016, 5 pages.
"What will you create?", available at <<https://hellonod.com/>>, product page, Nod, Inc., Mountain View, California, accessed on Feb. 15, 2016, 6 pages.
"Audio Spot Light", available at <<https://holosonics.com/content/6Technology>>, product page, Holosonic Research Labs, Inc., Watertown, Massachusetts, accessed on Feb. 15, 2016, 7 pages.
Chang et al., "Autonomous Indoor Waytinding for Individuals with Cognitive Impairments", Journal of NeuroEngineering and Rehabilitation, published Sep. 14, 2010, 20 pages.
Conte et al., "BlueSentinel: a first approach using iBeacon for an energy efficient occupancy detection system", Proceedings of the 1st ACM Conference on Embedded Systems for Energy-Efficient Buildings, Nov. 5, 2014, 10 pages.
Dunn, Zach, "Ideas for Using Beacons in the Office", published Sep. 17, 2015, available at <<https://robinpowered.com/blog/using-ibeacons-in-the-office-for-work/>, 6 pages.
Dunn, Zach, "Using iBeacons to Sense Presence", published Sep. 12, 2015, available at <<https://robinpowered.com/blog/using-ibeacons-to-detect-presence-in-a-room/>>, 10 pages.
Katsaros et al., "Wireless Information Highways", Proceedings of IGI, published Dec. 31, 2004, 2 pages.
Kolodziej et al., "Local Positioning Systems: LBS Applications and Services", Publication of CRC Press, May 10, 2006, 1 page.
Kray et al., "Adaptive Navigation Support with Public Displays", Proceedings of the 10th International Conference on Intelligent User Interfaces, 2005, 4 pages.
"Non Final Office Action Issued in U.S. Appl. No. 15/054,166", dated Sep. 7, 2018, 29 Pages.
"Final Office Action issued in U.S. Appl. No. 15/089,327", dated Jul. 17, 2017, 10 Pages.
"Non Final Office Action issued in U.S. Appl. No. 15/089,327", dated Oct. 18, 2017, 10 Pages.
"Final Office Action issued in U.S. Appl. No. 15/089,537", dated Jun. 29, 2018, 21 Pages.
"Non Final Office Action issued in U.S. Appl. No. 15/089,537", dated Oct. 25, 2017, 18 Pages.
"International Search Report and Written opinion issued in PCT Application No. PCT/US2017/024643", dated Jul. 3, 2017, 14 pages.
"International Search Report and Written Opinion Issued in PCT Application No, PCT/US2017/024646", dated Jun. 20, 2017, 11 Pages.
"Final Office Action Issued in U.S. Appl. No. 15/054,166", dated Feb. 7, 2019, 28 Pages.

(56) References Cited

OTHER PUBLICATIONS

"Non Final Office Action issued in U.S. Appl. No. 15/089,537", dated Feb. 5, 2019, 21 Pages.
"Final Office Action Issued in U.S Appl. No. 15/089,537", dated May 17, 2019, 23 Pages.
"Office Action Issued in European Patent Application No. 17708079.3", dated May 28, 2019, 6 pages.
"Notice of Allowance Issued in U.S. Appl. No. 15/054,166", dated Jul. 1, 2019, 13 Pages.
Taher, et al., "Exploring User Preferences for Indoor Navigation Support through a Combination of Mobile and Fixed Displays", In Proceedings of the 13th International Conference on Human Computer Interaction with Mobile Devices and Services, Aug. 30, 2011, pp. 201-210.

* cited by examiner

DETECTING A WIRELESS SIGNAL BASED ON CONTEXT

BACKGROUND

Beacons, such as BLUETOOTH Low Energy (BLE) beacons, operate by broadcasting a periodic wireless beacon signal. The beacon signal carries a code that is associated with the beacon that emitted it. A location-based service can determine the approximate location of a receiving device by determining whether the receiving device is capable of receiving the wireless signal. That is, if the receiving device is capable of receiving the wireless signal, it is presumed to exist in close proximity to the beacon that emitted it.

A device consumes a relatively large amount of power when sending or detecting wireless beacon signals. In many cases, such a device uses a battery power source. The broadcast and detection of beacon signals can therefore rapidly deplete the power supply of a device, rendering it inoperable.

SUMMARY

A technique is described herein for efficiently detecting a wireless beacon signal emitted from a beacon-emitting mechanism. The technique operates by selectively increasing detection activity when a detection event is likely to occur, and decreasing it otherwise. The technique leverages calendar information as one factor in determining when a detection event is likely to occur. Overall, the technique can reduce consumption of power by a computing device which performs the detection activity.

In one implementation, the technique varies detection activity by checking, at a selected detection rate, to determine whether the wireless signal is present in a local environment. Alternatively, or in addition, the technique performs the detection activity by broadcasting, at a selected detection rate, the wireless signal into the local environment.

According to another illustrative aspect, the technique can also vary the detection activity based on location information (identifying the location of a user) and/or motion information (describing the movement of the user).

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
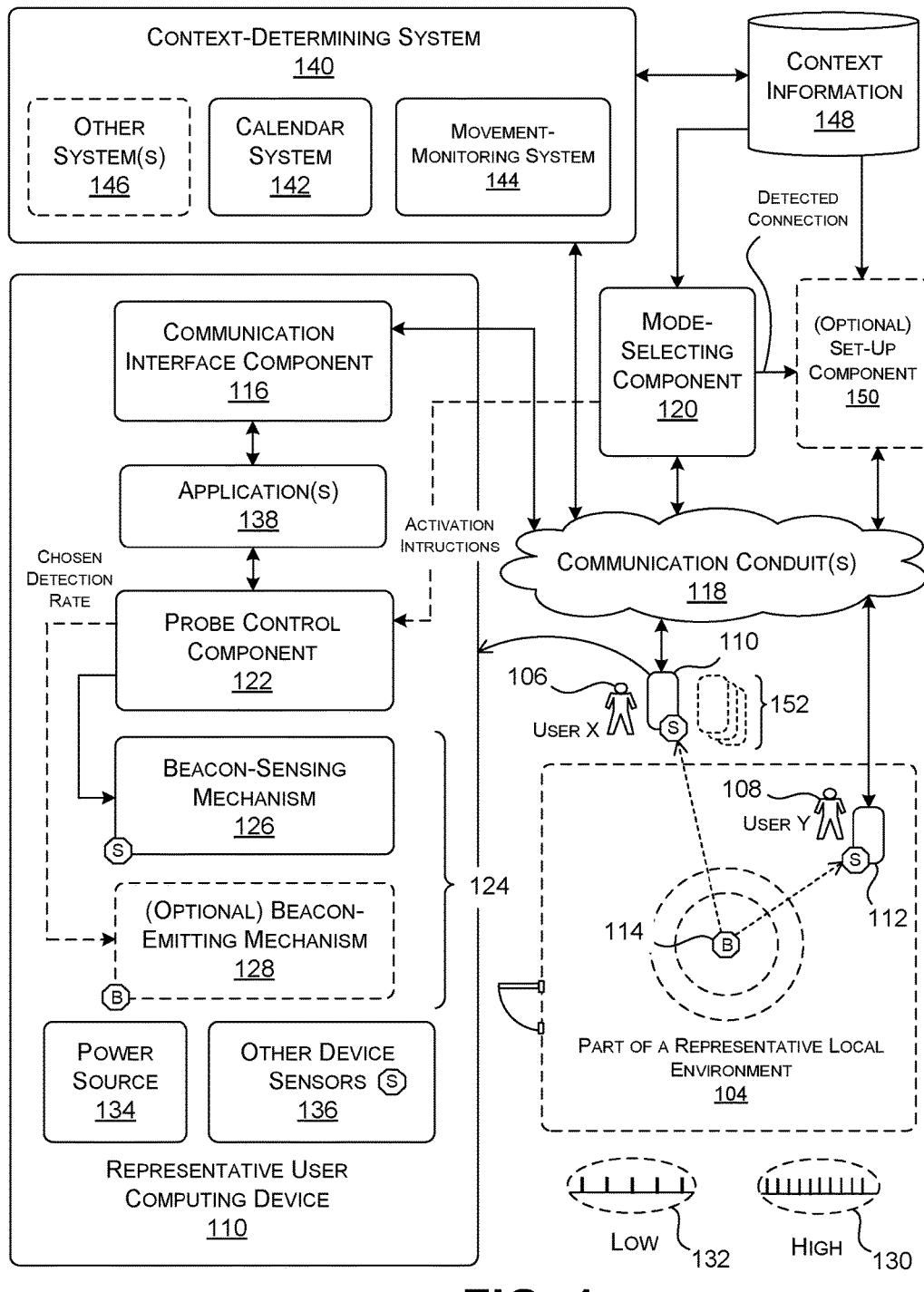
FIG. 1 shows an illustrative system for detecting a wireless signal in a variable manner based on activation instructions.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for detecting a wireless signal in a context-based manner. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of tangible computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows a system 102 for detecting the presence of a wireless beacon signal ("wireless signal" henceforth) within a local environment 104. The system 102 generates activation instructions to identify, in certain cases, at least one span of time at which a detection event is likely to occur. The system 102 then increases the rate of detection activity during that span of time. The detection activity involves checking the local environment 104 for the presence of the wireless signal and/or emitting the wireless signal into the local environment 104.

FIG. 1 shows a merely representative local environment 104 that is defined as a region in which a wireless signal emitted from a particular beacon-emitting mechanism (for brevity, a beacon (B)) (described below) can be detected. Here, the local environment 104 encompasses the entirety of a space associated with a conference room, and optionally some area outside, but in close proximity to, the conference room. At a current time, FIG. 1 shows that a representative user 106 (user X) is located outside the conference room and the local environment 104 associated therewith. FIG. 1 also shows a representative user 108 (user Y) that is located within the conference room and the local environment 104 associated therewith. The user X 106 carries a user computing device 110, while the user Y 108 carries a user computing device 112.

Note that the local environment 104 need not correspond to the kind of office setting described above. In other cases, the local environment 104 can correspond to another kind of indoor setting, an outdoor setting, or a combination of an indoor and an outdoor setting.

Each user computing device (110, 112) can correspond to any type of electronic device that performs processing functions, including a smartphone (or other type of portable telephone), a laptop computing device, a tablet-type computing device, a portable game device, a media consumption device, a wearable computing device, an electronic tag or key, and so on, or some combination thereof. In these instances, each user computing device performs processing functions using one or more general-purpose processing devices, which process instructions stored in a computer-readable storage medium. In other cases, a user computing device may include specialized processing functionality, such as an Application Specific Integrated Circuit (ASIC), rather than, or in addition to, a general purpose processing device. In a first implementation, assume that each user computing device (110, 112) includes at least a beacon-sensing mechanism (for brevity, a sensor (S)) for sensing a wireless signal emitted from the beacon (B).

As used herein, a beacon-emitting mechanism refers to any transmitting apparatus that emits an electromagnetic (wireless) probe signal (or other type of wireless signal) on a periodic basis and/or on any other basis (e.g., an event-driven basis), as governed by any protocol or combination of protocols. For example, the probe signal may correspond to a BLUETOOTH probe signal of any type (e.g., a BLUETOOTH low energy probe signal), a Wi-Fi probe signal, etc. A beacon-emitting mechanism can generate its probe signal using any part of the electromagnetic spectrum (e.g., radio, infrared, etc.). In other cases, the beacon-emitting mechanism can emit a sound probe signal (e.g., an ultrasound signal, etc.), corresponding to another type of wireless signal. A beacon-sensing mechanism refers to any signal-detecting apparatus that can detect the wireless signal emitted by a beacon-emitting mechanism. More specifically, a beacon-sensing mechanism can receive any information conveyed by the wireless signal, a strength of the wireless signal, a directionality of the wireless signal, etc.

In the case of FIG. 1, the beacon (B) corresponds to a beacon-emitting mechanism 114 that emits any type of wireless signal within the local environment 104. FIG. 1 shows that the conference room includes a single beacon-emitting mechanism 114. But the conference room can alternatively include two or more beacon-emitting mechanisms.

The beacon-emitting mechanism 114 emits a wireless signal that includes a code that is associated with the particular beacon-emitting mechanism 114. The wireless signal also includes a prescribed range in which it can be detected by the beacon-sensing mechanisms provided by the user computing devices (110, 112). If a user computing device can detect the wireless signal emitted from the beacon-emitting mechanism 114, it can be presumed to be within an area defined by the range of the beacon-emitting mechanism 114. In other words, upon a detection event, a user computing device and the user associated therewith can be presumed to exist within the local environment 104.

In another implementation to be described below (with reference to FIG. 5), each user computing device (110, 112) includes a beacon-emitting mechanism (beacon, B), while the local environment 104 includes a beacon-sensing mechanism (sensor, S). A user computing device is presumed to be within an area defined by the range of the beacon-emitting mechanism when the beacon-emitting mechanism can detect the wireless signal emitted by that user computing device. Here, the spatial scope of the local environment is defined as the range at which the fixed beacon-sensing mechanism can detect the wireless signal emitted from a mobile user computing device. Still other implementations (described below) are possible involving different uses of beacon-emitting mechanisms and beacon-sensing mechanisms.

In the merely representative case of FIG. 1, assume that the user computing device 112 operated by user Y 108 has already detected the wireless signal emitted by the beacon-emitting mechanism 114. But assume that the user computing device 110 operated by user X 106 has not yet detected the wireless signal. For instance, the user computing device 110 may currently be out of range of the wireless signal, and is therefore incapable of detecting it. The purpose of the system 102 as a whole is to facilitate the detection of a user within the local environment 104. Therefore, the operation of the system 102 will be described below in the context of the detection, by the representative user computing device 110 (associated with the user X 106), of the wireless signal emitted by the beacon-emitting mechanism 114. Other user computing devices operate in a similar manner to the user computing device 110.

FIG. 1 shows one non-limiting implementation of the user computing device 110. The user computing device 110 includes a communication interface component 116. The communication interface component 116 corresponds to a mechanism for interacting with other parts of the system 102 via one more communication conduits 118. For instance, the communication interface component 116 can correspond to a network interface card in association with protocol stack functionality, etc.

The communication conduit(s) 118, in turn, may correspond to a wide area network (e.g., the Internet), a local area network, one or more point-to-point links, etc., or any combination thereof. The communication conduit(s) 118 can include any combination of hardwired links, wireless links, routers, gateway functionality, etc., governed by any protocol or combination of protocols.

The communication interface component 116 receives activation instructions from a mode-selecting component 120. Generally, the activation instructions command the user computing device 110 to perform detection activity in a prescribed manner; on some occasions, for instance, the activation instructions describe at least one span of time at which heightened detection activity is to occur. The mode-selecting component 120, in turn, generates the activation instructions based on context information. The context information describes factors which have a contextual bearing on the user's interaction with an overall environment at any given time. As just one part thereof, the context information can include calendar information. The calendar information describes one or more scheduled events in which the user X 106 is a participant. Assume that one such scheduled event corresponds to a meeting to be held at a particular time in the conference room depicted in FIG. 1. As will be clarified below, the mode-selecting component 120 can be implemented by a computing system (e.g., by a cloud-computing platform) that is separate from the user computing device 110, or by the user computing device 110 itself, or by a combination thereof.

The user computing device 110 also includes a probe control component 122. The probe control component 122 determines a detection rate at which a detection activity is to take pace at a current time. The probe control component 122 determines the detection rate based on the activation instructions. For instance, if the activation instructions indicate that there is a heightened potential for detecting the wireless signal at the current time, then the probe control component 122 will select an elevated detection rate (as opposed to a normal detection rate).

A probing component 124 performs the detection activity at each given time based on the detection rate specified by the probe control component 122. The probing component 124 includes at least a beacon-sensing mechanism 126. In other implementations, the probing component 124 may, in addition, or alternatively, include a beacon-emitting mechanism 128.

In the principal implementation of FIG. 1, the beacon-sensing mechanism 126 performs the detection activity at the prescribed detection rate by scanning the local environment 104 for the presence of the wireless signal (emitted by the beacon-emitting mechanism 114) at the detection rate. As such, when the activation instructions indicate that there is a high probability of finding the wireless signal, the beacon-sensing mechanism 126 will performing checking at a relatively high rate, a representative sample 130 of which is shown in FIG. 1. When the activation instructions indicate that there is low probability of finding the wireless signal, the beacon-sensing mechanism 126 will perform checking at a lower rate, a representative sample 132 of which is shown in FIG. 1. Here, two levels of detection activity are mentioned; but more generally, the system 102 can accommodate any number of discrete levels of detection activity, including a zero-value level (in which no detection activity is performed). In yet other cases, the system 102 can apply a dynamic detection rate that continuously varies based on some variable and/or factor(s) specified by the activation instructions.

The beacon-sensing mechanism 126 performs an instance of checking by activating a receiving circuit to determine if the wireless signal, transmitted by the beacon-emitting mechanism 114, can be detected. In other implementations (described below), the beacon-emitting mechanism 128 performs the detection activity at the prescribed detection rate by emitting a wireless signal at the prescribed detection rate.

The user computing device 110 also includes a power source 134, such as a battery power source or a fixed power source (e.g., an AC power interface that receives power from a stable grid AC power source). The user computing device 110 can efficiently consume power provided by the power source 134 because it performs detection activity at high rates only when there is a heightened probability of detecting the wireless signal. Stated in the negative, the user computing device 110 will not waste power by performing detection activity at high rates when that activity is unlikely to result in the detection of the wireless signal. Because of this behavior, the user computing device 110 reduces the rate at which power supplied by a battery power source is consumed.

The user computing device 110 can also include one or more other device sensors 136. For instance, the other device sensors 136 can include any combination of: an accelerometer, a gyroscope, a magnetometer, a Global Position Positioning System (GPS) sensor, a Near Field Communication (NFC) detection mechanism, etc. A context-determining system (to be described below) can leverage the sensor information provided by these sensors to determine the location (absolute and/or relative) of the user computing device 110, and the motion of the user computing device. The other device sensors 136 can also include any of an image capture mechanism, a video capture mechanism, one or more microphones, a light sensor, etc. The context-determining system can leverage sensor information provided by these sensors to provide additional insight regarding the user's location (and other facets of the user's state) within an environment.

Finally, the user computing device 110 includes one or more applications 138. Each application performs any environment-specific task. For instance, one application may allow the user X 106 to send and receive Email messages. Another application may allow the user X 106 to interact with other users via a video conferencing system. Another application may allow the user X 106 to interact with a calendaring system, and so on. Other functionality provided by the user computing device 110 can perform various lower-level tasks, such entering a "do not disturb" state (in which the user computing device 110 ignores specified events, such as incoming messages), entering a battery management mode (in which the user computing device 110 consumes power based on any specified plan(s) or factor(s)), and so on. The mode-selecting component 120 can optionally take any of these states/modes into account when generating its activation instructions for the user computing device 110, to the extent that these states/modes impact the ability of the user computing device 110 to perform detection activity. For example, if the mode-selecting component 120 learns that the user computing device 110 has entered a low battery-consumption mode, it may decline to send the activation instructions to the user computing device 110.

Now referring to other parts of the system 102, a context-determining system 140 provides context information. The context information describes the current context in which one or more users are currently interacting with the system 102. The context-determining system 140, in turn, is composed of plural subsystems. For instance, the context-determining system 140 can include a calendar system 142 for creating, storing, and maintaining calendar information. The calendar information describes scheduled events. At least some of the scheduled events identify users who interact with the system 102 as participants.

The context-determining system 140 can also include a movement-monitoring system 144. The movement-monitoring system 144 monitors the locations and motions of user computing devices within the local environment 104. (That is, the general term "movement" is used herein to encompass the positioning of an entity in space, as well as the dynamic motion of that entity.) To perform this task, the movement-monitoring system 144 leverages sensor information provided by the user computing devices (and/or other sensors in an overall environment). The context-determining system 140 can also include one or more other systems 146.

Figure 7:
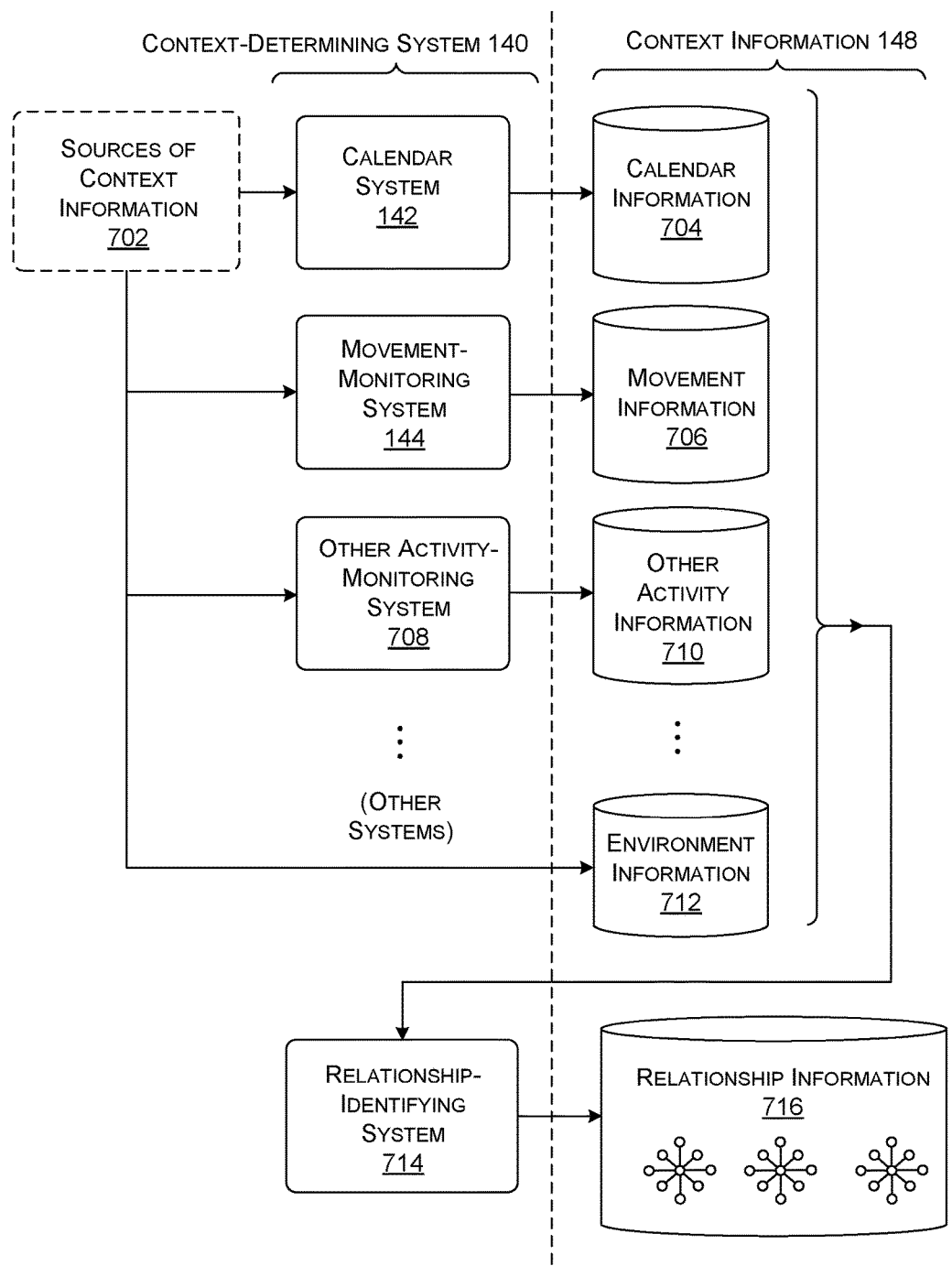
FIG. 7 shows one implementation of a context-determining system, which is one part of the system of FIG. 1.

The context-determining system 140 stores all of the context information that it collects and/or generates in one or more data stores 148. FIG. 7 and its accompanying explanation (below) provide additional information regarding the operation of the context-determining system 140.

Figure 8:
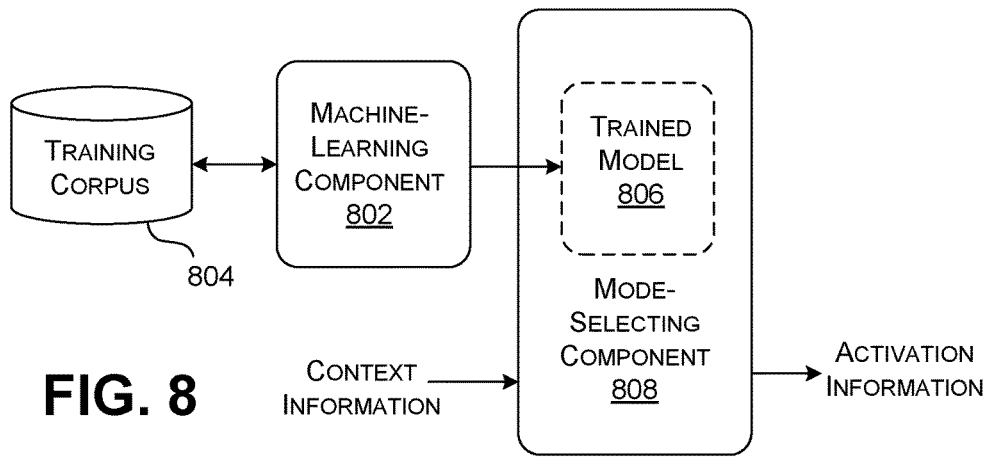
FIG. 8 shows one implementation of a mode-selecting component, which is another part of the system of FIG. 1.
Figure 9:
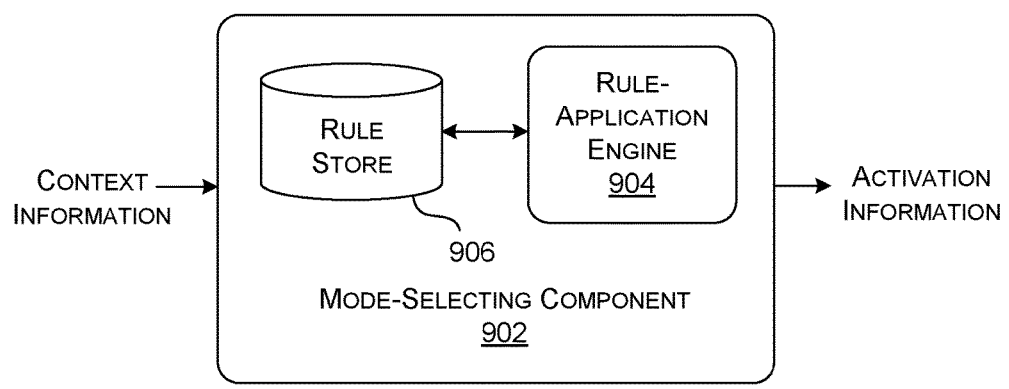
FIG. 9 shows another implementation of the mode-selecting component.

The mode-selecting component 120 generates the activation instructions based on the context information. The activation instructions describe, on a per-user basis, a detection plan or regimen to be performed by a user computing device that is associated with a particular user. In other words, in some cases, the activation instructions describe at least one span of time at which there is a heightened probability of detecting a wireless signal. FIGS. 8 and 9 and the accompanying explanation (below) provide additional information regarding the operation of the mode-selecting component 120.

An optional set-up component 150 performs set-up operations when a connection has established. For example, assume that the user X 106 eventually comes close enough to the beacon-emitting mechanism 114 to enable the user computing device 110 to detect the wireless signal emitted by the beacon-emitting mechanism 114. And further assume that the user moves into the local environment 104 for the purpose of attending a scheduled meeting. The optional set-up component 150 can perform one or more set-up tasks that facilitate the start of the meeting.

FIG. 1 also indicates that, in another situation, the user 106 may carry a collection 152 of user computing devices as he or she moves within an environment, including the user computing device 110 described above, and one or more other user computing devices. For example, the user 106 may carry any of a smartphone, a tablet-type computing device, a laptop computing device, a wearable computing device, etc. The mode-selecting component 120 can control the detection activity of any of these user computing devices in the manner described above. Subsection A.5 (below) provides additional information regarding the above-noted multi-device scenario.

Further note that FIG. 1 depicts the context-determining system 140, the mode-selecting component 120 and the set-up component 150 as functionality that is physically separate from the representative user computing device 110. For instance, a cloud-computing platform or other type of computing system may implement these components. The cloud-computing platform is made up of one or more server computing devices (and optionally other electronic equipment, such as routers, load balancers, etc.). But each user computing device 110 can alternatively incorporate any part(s) of the context-determining system 140, the mode-selecting component 120, and/or the set-up component 150. For instance, the representative user computing device 110 can include an application that handles at least some of the functions performed by the calendar system 142. In another case, the user computing device 110 can, at least in part, generate the activation instructions based on local analysis that it performs.

As a final point in this introductory subsection, note that, in one implementation, the only agents that perform variable detection activity are the user computing devices. But in another implementation, the beacon-emitting mechanism 114 can, alternatively, or in addition, vary the rate at which it emits the wireless signal based on context information.

A.2. Examples

Figure 2:
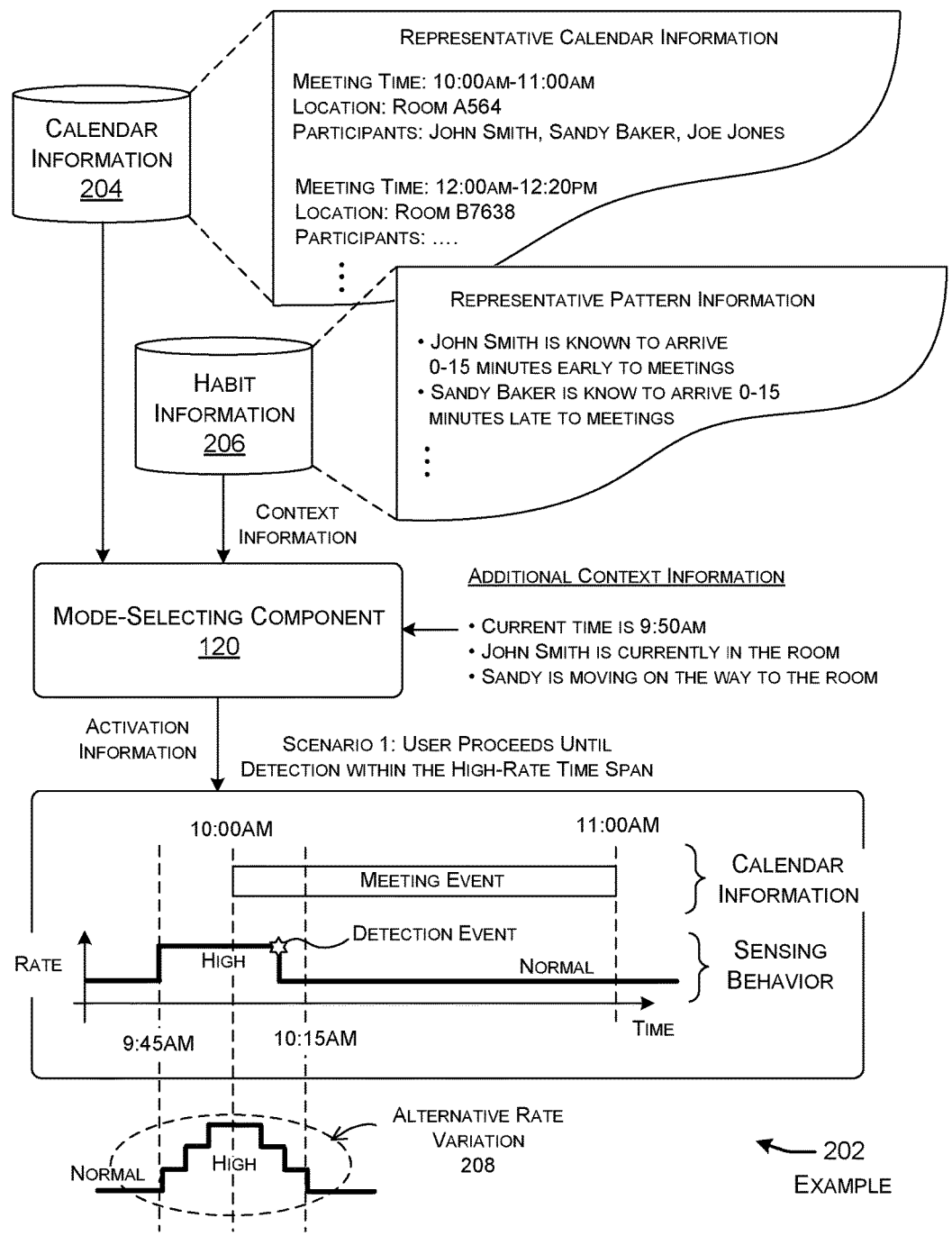
FIG. 2 shows an example of the application of the system of FIG. 1.

FIG. 2 shows a first example 202 of the use of the system 102 of FIG. 1 to detect a wireless signal. Here, assume that the system 102 generates activation instructions and sends the instructions to the user computing device 110 being carried by the user X 106, the fictional Sandy Baker. The user computing device 110 uses the activation instructions to govern the rate at which it checks for a wireless signal emitted by the beacon-emitting mechanism 114.

In this situation, the calendar information (provided in a data store 204) indicates that there is a scheduled event that runs from 10:00 AM to 11:00 AM, to be held in a conference room No. A564. The scheduled event involves a set of participants, including user X 106. The local environment 104 corresponds to a space that includes the interior of the conference room, and perhaps a region in close proximity to the conference room. The system 102 determines whether the user X 106 is within or near the conference room based on whether the user computing device 110 can detect the wireless signal emitted by the beacon-emitting mechanism 114.

Habit information (provided in a data store 206) indicates that the user X 106 is known to arrive between 0 to 15 minutes late to a meeting, e.g., which is a conclusion that is derived based on previously recorded instances of the user's arrival at meetings. Other context information (e.g., provided by the movement-monitoring system 144) indicates that the user X 106 is currently walking towards the conference room. The context information also indicates that at least one other participant (the fictional "John Smith") is currently in the conference room.

The mode-selecting component 120 generates activation instructions based on the above-described context information. The activation instructions generally describe a plan or regimen for detecting the wireless signal emitted by the beacon-emitting mechanism 114. More specifically, in some instances, the activation instructions describe at least one span of time for which there is a heightened probability of detecting the wireless signal. The probe control component 122 generates an appropriate detection rate based on the activation instructions, at each instance of time. The probing component 124 executes detection activity at each instance at the detection rate specified by the probe control component 122.

According to one merely represented case, FIG. 2 shows that the system 102, based on the activation instructions, elevates the detection level from a normal level to a heightened level at time 9:45, 15 minutes prior to the start of the meeting (at 10:00 AM). The system 102 elevates the level at this juncture because it is determined that there is a heightened probability that the user X 106 will be nearing the meeting room within this time span. The system 102 is configured to maintain the heightened detection rate until 15 minutes after the start of the meeting (i.e., until 10:15 AM), based on the premise that the user X 106 may alternatively arrive late for the meeting. But in this specific example, the system 102 drops the detection rate to the normal level at time 10:10 AM because the user computing device 110 detects the wireless signal at that time. Note that the above-described sensing behavior is tailored to a particular user, i.e., user X 106. The system 102 can specify different sensing behaviors for other users who are scheduled to attend the meeting.

Note that FIG. 2 shows that the probe control component 122 selects, based on the activation instructions, a detection rate from among a set of just two detection rates, a high level and a low level. A detection rate defines a frequency at which the beacon-sensing mechanism 126 checks the local environment 104 for the presence of the wireless signal. More specifically, a detection rate defines a frequency at which the beacon-sensing mechanism 126 wakes up and determines if the wireless signal can be detected. (In another implementation, a detection rate defines the frequency at which the beacon-emitting mechanism 128 emits a wireless signal into the local environment 104.)

In other cases, the probe control component 122 can vary the detection rate with respect to any number of discrete levels. Each detection rate maps to a predetermined probability of detecting the wireless signal in the local environment 104. For example, FIG. 2 shows another example 208 in which the probe control component 122 uses stair-step function to ramp up the detection rate at time 9:45 from a normal level to a highest level (at time 10:00 AM), and then ramp down the detection rate to the normal level at time 10:15 AM, assuming that the user computing device 110 does not detect the wireless signal by that time. Alternatively, or in addition, the probe control component 122 can vary a detection rate in a continuous manner, e.g., based on any function.

Figure 3:
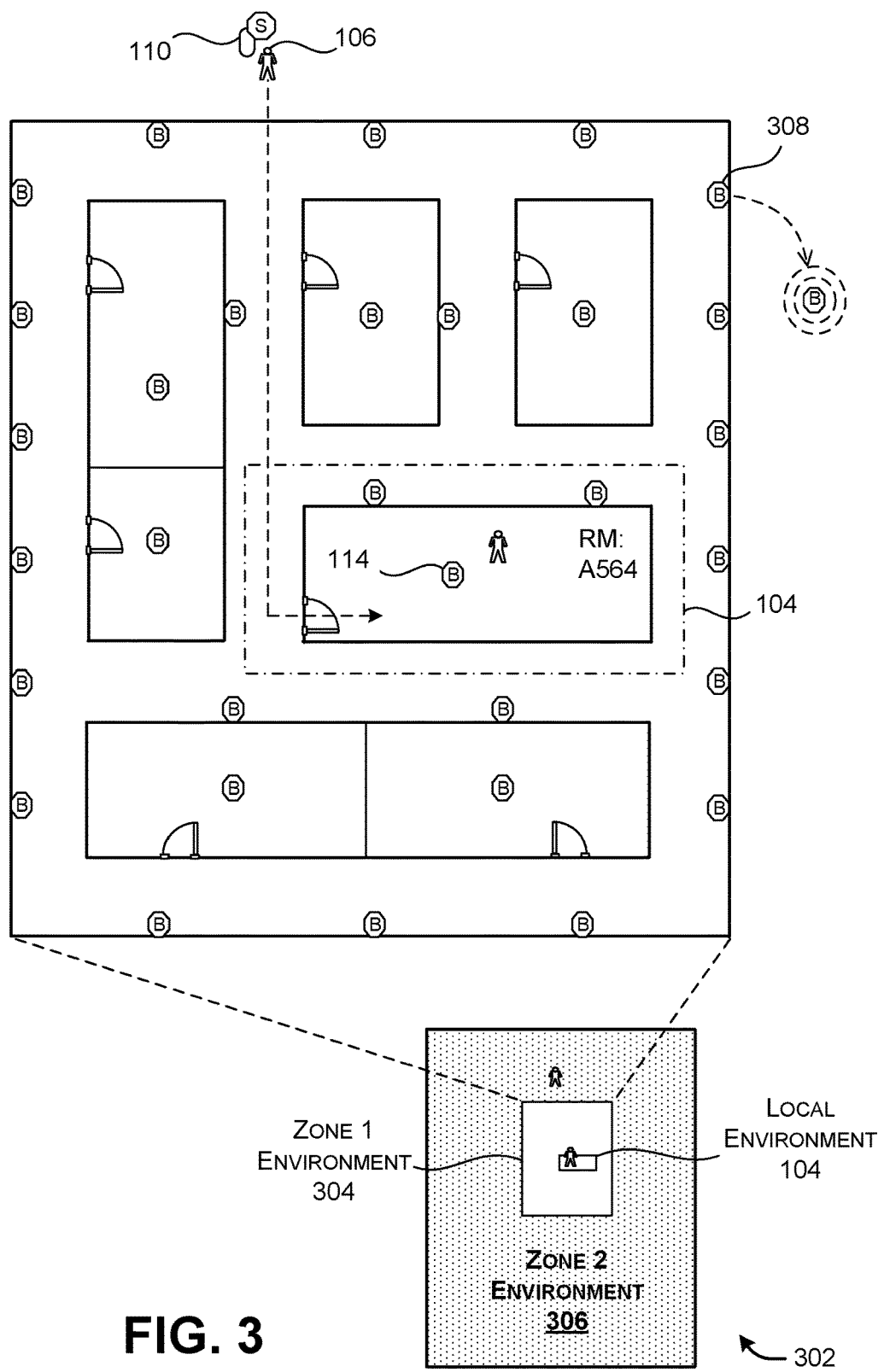
FIG. 3 shows an environment in which the system of FIG. 1 can be applied.

FIG. 3 shows a portion of an overall environment 302, which provides context for the explanation of the scenario of FIG. 4 (to be described below). The overall environment 302 includes the above-described local environment 104, defined by a space at which it is possible to detect the wireless signal emitted by the beacon-emitting mechanism 114. The local environment 104 generally corresponds to a conference room. The overall environment 302 also includes a zone 1 environment 304 that is larger than the local environment 104, and which encompasses the local environment 104. The overall environment 302 also includes a zone 2 environment 306 which corresponds to all regions of the overall environment 302 outside the zone 1 environment 304. Note that FIG. 2 shows two zones merely by way of example, not limitation. Other environments can be partitioned into any number of zones having any respective sizes and shapes.

The movement-monitoring system 144 can detect the user's actual position within the overall environment 302 based on sensor information provided by the user computing device 110 and/or the beacon-sensing mechanisms (sensors, S) placed at various locations in the overall environment 302. For example, FIG. 3 shows that the zone 1 environment 304 includes a collection of beacon-emitting mechanisms (such as representative beacon-emitting mechanism 308) dispersed throughout. The movement-monitoring system 144 can determine the user's location within the overall environment based on the wireless signal(s) that the user computing device 110 detects at the current time. For instance, the movement-monitoring system 144 determines that the user X 106 is near the beacon-sensing mechanism 308 when the strongest signal detected by the user computing device 110 corresponds to the wireless signal emitted by the beacon-emitting mechanism 308 (where that signal bears a code that is associated with the beacon-emitting mechanism 308). The movement-monitoring system 144 can detect the user's position in yet other ways, such as, but not limited to: using GPS sensor information received from a GPS sensor provided by the user computing device 110; using a radio triangulation technique; using a dead-reckoning technique; based on the user's manual scanning of a particular code at a particular location within the overall environment 302; based on the user's use of a particular access key or card at a particular location within the environment 302; based on recognition of the user's voice or other user-indicative sounds at a particular location within the environment 302 (e.g., using known voice recognition technology that operates on audio information captured by one or more microphones); based on recognition of the user's face, gait, body shape, clothing, etc. at a particular location within the environment 302 (using known image recognition technology that operates on video information captured by one or more video cameras); based on the user's computer-based activity within the environment 302, etc., or any combination thereof. In addition, or alternatively, the movement-monitoring system 144 can infer the user's location based on prior activity information pertaining to the user X 106, e.g., habit information, etc. In whatever way location is determined, the movement-monitoring system 144 can leverage the location information to determine whether the user X 106 is within the zone 1 environment 304 or the zone 2 environment 306.

The movement-monitoring system 144 can also detect whether the user X 106 is moving at any given time. The movement-monitoring system 144 can reach this conclusion by identifying the manner in which the user X 106 moves across a series of identified locations, e.g., by determining the rate of change of the user's position with respect to time. In addition, or alternatively, the movement-monitoring system 144 can determine the movement status of the user X 106 based on sensor information provided by the user computing device's accelerometer, gyroscope, magnetometer, etc.

In the merely illustrative example of FIG. 3, assume that the user X 106 is currently within the zone 2 environment 306. Further assume that the user X 106 is currently moving toward the zone 1 environment 304 for the purpose of attending a meeting that begins at 10:00 AM.

Assume that the system 102 formulates activation instructions that embody the following logic. As a first rule, the logic specifies that the probe control component 122 will transition from a low detection rate to a high detection rate 15 minutes prior to the start of the meeting. The probe control component 122 will then transition from the high detection rate to the low detection rate 15 minutes after the start of the meeting, assuming that the wireless signal emanating from the conference room has not been detected by the user computing device 110. But there are two circumstances that will override this behavior. First, the activation instructions specify that the probe control component 122 will use a low detection level when the user X 106 is outside of the zone 1 environment 304. The system 102 adopts this rule because it is unlikely that the user X 106 can successfully detect the wireless signal if he or she is sufficiently far from the source of that signal. Second, the probe control component 122 will use a low detection level when it determines that the user X 106 has paused on his or her way to the intended destination, even when the user X 106 is within the zone 1 environment 304 (but outside the local environment 104 itself). This logic is described here by way of illustration, not limitation; other implementations can adopt any other logic.

Further note that, as stated above, the mode-selecting component 120 can specify different sensing plans or regimens for different users. For example, the mode-selecting component 120 can choose different time spans for different users for which detection activity is performed at a high rate (with reference to a start time of a scheduled event). In addition, the mode-selecting component 120 can increase the size of the zone 1 environment 304 for another user based on one or more factors, such as the meeting set-up preferences of that user, the type of user computing device used by the user, the typical rate of travel of that user, etc.

Figure 4:
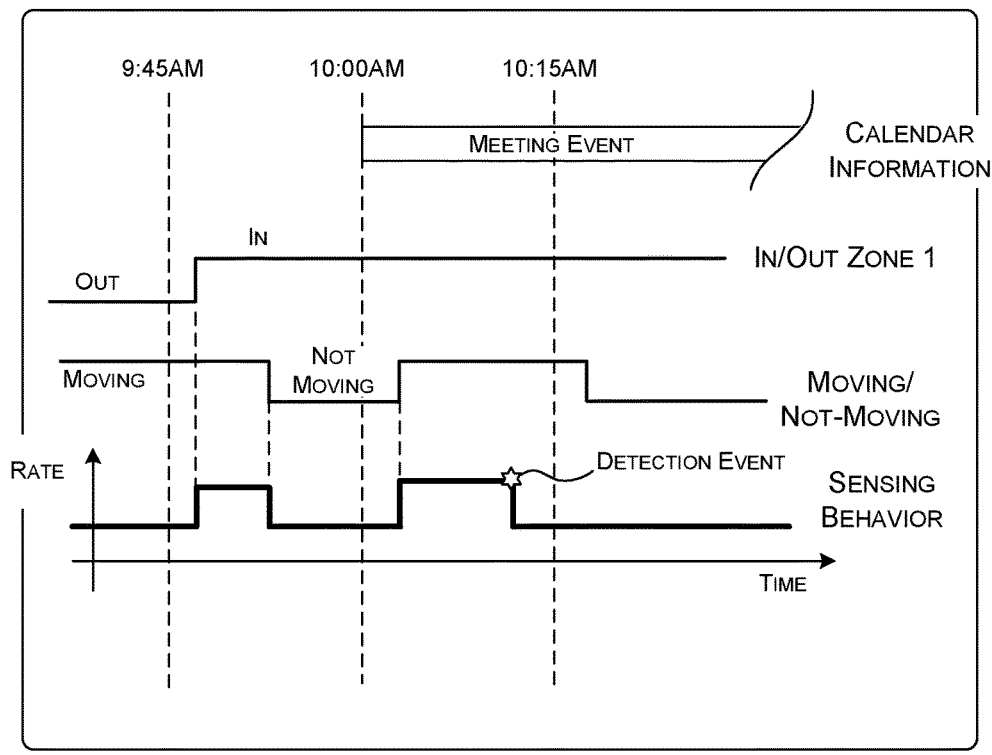
FIG. 4 shows another example of the application of the system of FIG. 1.

FIG. 4 plots the sensing behavior provided by the system 102 for a particular factual situation. Assume that at time 9:47 AM, the probe control component 122 transitions from the low detection rate to the high detection rate. The probe control component 122 elevates the detection rate at this time because: (1) the current time (9:47 AM) is after to the triggering time 9:45 AM, the time at which heightened detection is scheduled to occur with reference to the start of the meeting (at 10:00 AM); and (2) the user advances from the zone 2 environment 306 into the zone 1 environment 304 at time 9:47 AM. In other words, the probe control component 122 does not immediately elevate the detection rate at time 9:45 AM because the user is outside of the zone 1 environment 304 at that time.

At time 9:50 AM assume that the user X 106 pauses in the hallway in the zone 1 environment 304 to talk to colleague, and remains in conversation until time 10:05 AM. In response, the probe control component 122 drops the elevation rate from high to normal. The probe control component 122 resumes the high detection rate at time 10:05 AM when the user begins to move again.

Finally, assume that the user computing device 110 carried by the user X 106 detects the wireless signal (emitted by the beacon-emitting mechanism 114) at time 10:10 AM. At that time, the probe control component 122 drops the detection rate from high to low.

Again, FIG. 4 shows a case in which the system 102 applies only two detection levels, low and high. But the probe control component 122 can use any number of discrete detection levels and/or a continuous range of detection levels.

Further note that the term "scheduled event" has an expansive meaning as used herein. In one case, a user can formally create a scheduled event by interacting with the calendar system 142, defining the start of the event, the end of the event, the participants of the event, and so on. Or the calendar system 142 can create the scheduled event on behalf of the user, e.g., by using machine-learned language understanding technology to infer the scheduled event based on information provided in an Email message thread, a spoken conversation, etc. (as when a user states to another user, "Let's meet tomorrow at 10 AM in your building"). In other cases, the context-determining system 140 (not shown in FIG. 1) can determine that the user repeatedly performs the same activity at a specified place and time. For example, the context-determining component 140 can determine that the user visits the cafeteria generally between 8:00 AM and 8:30 AM on weekdays. The context-determining system 140 can define this activity as a scheduled event, even though the user did not formally define that event in the calendar system 142. The system 102 can invoke context-sensitive signal detection for implicit scheduled events in the same manner described above with respect to explicitly-created calendar events. For example, the system 102 can increase the rate at which detection activity is performed based on an assumption that the user X 106 is approaching the cafeteria, even though the cafeteria visit is not an explicit calendared event.

As a further feature, the mode-selecting component 120 can vary the detection rate during a meeting (or other event) based on one or more occurrences during the meeting. For example, a machine-trained voice recognition model can determine that a meeting participant makes an utterance that suggests a desire to establish wireless connection with some piece of equipment in the conference room, or another user, etc. For instance, the machine-trained voice recognition model can detect the following utterance: "Let's project the slide deck John prepared so we can talk about it." In response, the mode-selecting component 120 can increase the detection rate at which the participant's user computing device checks for a beacon signal emitted by, or otherwise associated with, that piece of equipment.

As another feature, the mode-selecting component 120 can disable a transition to a high detection rate when it determines that some enabling condition has not occurred. For example, assume that a meeting cannot formally get underway until a manager arrives at the conference room. The mode-selecting component 120 can prevent any participant from detecting the wireless signal at a high detection rate until the manager's user computing device detects the wireless signal. The context-determining system 140 can automatically collect activity information from which the above-described rule can be inferred.

The mode-selecting component 120 can adopt yet other detection rules and logic.

A.3. Other Ways of Detecting User Presence

Figure 5:
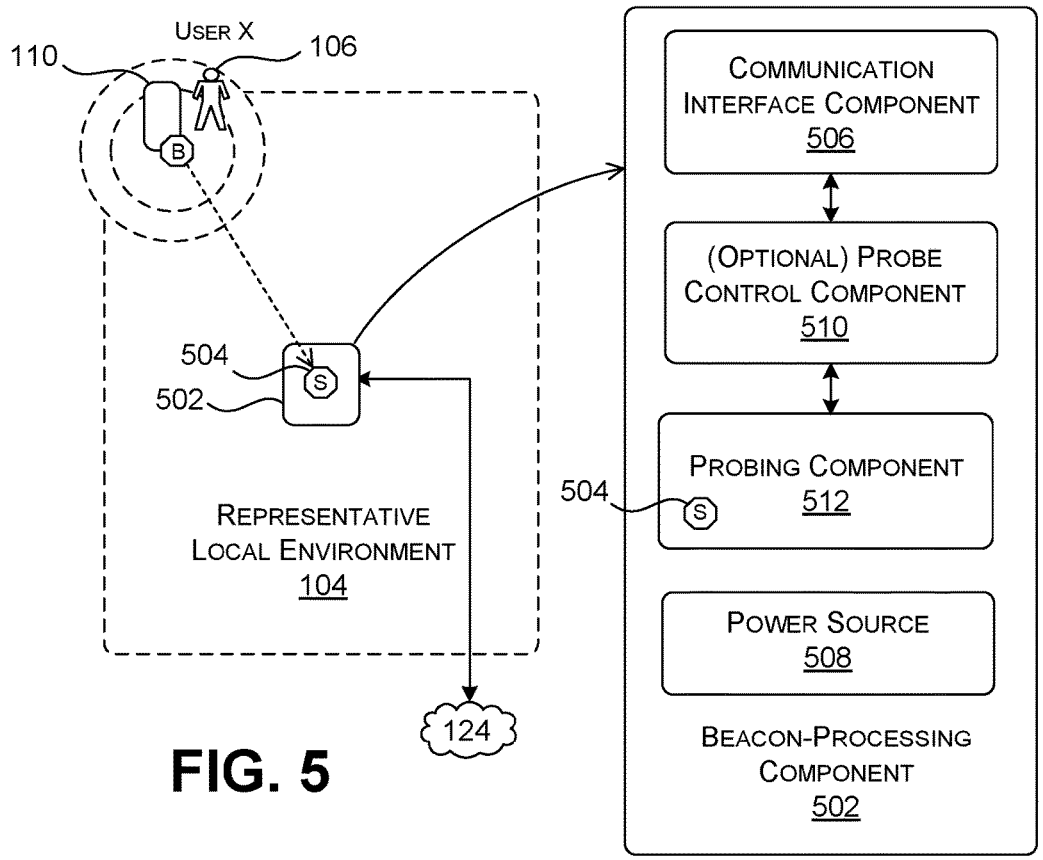
FIG. 5 shows another implementation of signal emission and signal detection functionality, compared to that shown in FIG. 1.

FIG. 5 shows alternative functionality for detecting the presence of the user X 106 within the local environment 104, compared to the example of FIG. 1. In the case of FIG. 5, the user computing device 110, carried by the user X 106, provides the beacon-emitting mechanism 128 (see FIG. 1). The beacon-emitting mechanism 128 emits a wireless signal that has a code that identifies the user computing device 110, and hence, which indirectly identifies the user X 106.

The local environment 104 includes a beacon-processing component 502. The beacon-processing component 502, in turn, includes a beacon-sensing mechanism 504. The beacon-sensing mechanism 504 detects the wireless signal emitted by the user computing device 110, when within range of that wireless signal. The beacon-sensing mechanism 504 can then forward that detection event to other parts of the system 102, such as the set-up component 150 via the communication conduit(s) 118.

In the example of FIG. 5, the user computing device 110 can leverage activation instructions (provided by the mode-selecting component 120) to vary the detection activity that it performs, customized for user X 106. Here, however, the detection activity refers to the rate at which the beacon-emitting mechanism 128 emits wireless signals.

FIG. 5 also shows one implementation of the beacon-processing component 502. The beacon-processing component 502 can include a communication interface component 506 for interacting with other parts of the system 102, such as the set-up component 150 via the communication conduit(s) 118. The beacon-processing component 502 can also include a power source 508.

In one implementation, the only agents in the implementation of FIG. 5 that vary their rates of detection activity are the user computing devices, including the user computing device 110. In another implementation, the beacon-processing component 502 can also optionally vary its detection activity. For instance, the beacon-processing component 502 can include a probe control component 510 and a probing component 512. These components (510, 512) operate in the same manner described above with respect to the same-named components of a user computing device. For example, the probing component 512 (which, here, corresponds to the beacon-sensing mechanism 504) can vary the rate at which it checks the wireless signal emitted from the user computing device 110, based on activation instructions sent by the mode-selecting component 120. More specifically, the components (510, 512) can optionally control detection activity on a per-user basis by scanning for different wireless signals, emitted by different user computing devices, based on different respective detection plans. In other cases, the components (510, 512) can control detection activity in a manner that affects two or more users in the same manner.

Figure 6:
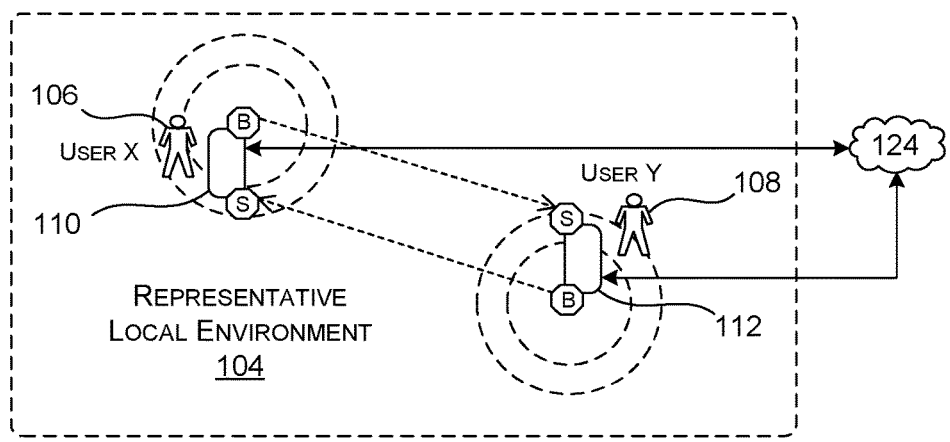
FIG. 6 shows another implementation of signal emission and signal detection functionality, compared to that shown in FIG. 1.

FIG. 6 shows alternative functionality for detecting the presence of the user X 106 within the local environment 104, compared to the example of FIG. 1. In the case of FIG. 6, the user computing device 110, carried by the user X 106, provides both the beacon-sensing mechanism (sensor, S) 126 and the beacon-emitting mechanism (B) 128 (see FIG. 1). The user computing device 112, carried by the user Y 108, also provides both a beacon-sensing mechanism (S) and a beacon-emitting mechanism (B). FIG. 6 shows only two user computing devices, but the local environment 104 can accommodate any number of user computing devices having the same components shown in FIG. 1.

The beacon-emitting mechanism (B) of the user computing device 110 emits a wireless signal that has a code that identifies the user computing device 110. The beacon-sensing mechanism (S) of the user computing device 112 can detect the wireless signal emitted by the user computing device 110, when within the range of that wireless signal. Similarly, the beacon-emitting mechanism (B) of the user computing device 112 emits a wireless signal that has a code that identifies the user computing device 112. The beacon-sensing mechanism (S) of the user computing device 110 can detect the wireless signal emitted by the user computing device 112, when within the range of that wireless signal. When any user computing device detects a wireless signal, it can notify other parts of the system 102 of that detection event (such as the set-up component 150, via the communication conduit(s)).

Both the user computing device 110 and the user computing device 112 can include a probe control component 122 and a probing component 124, as described above in the context of FIG. 1. Hence, the user computing device 110 can vary the rate at which it performs detection activity (e.g., at a first rate) and/or the rate at which it emits its own wireless beacon signal (e.g., at a second rate). The first rate can differ from the second rate or can be the same as the second rate. The user computing device 112 can perform the same variable-rate detection operations as the user computing device 110.

FIG. 6 varies from the example of FIG. 1 because the local environment 104, defined by the space at which a wireless signal emitted from a beacon can be detected, is no longer necessarily stationary. That is, in the scenario of FIG. 6, the system 102 can detect when the user X 106 is within a predetermined distance to user Y 108, without reference to a fixed geographic setting. The local environment 104, in fact, may correspond to a moving locale. For example, the user X 106 and the user Y 108 may be walking together, traveling in a vehicle (e.g., a taxi, etc.) together, etc. Otherwise, the system 102 can operate in the same way described above. For example, the system 102 can instruct both user computing devices (110, 112) to perform enhanced-rate detection activity 15 minutes prior to a scheduled meeting. In this case, the scheduled meeting locale need not be fixed; for instance, it can reflect the plans of two users to travel together. When in this mode, the user computing device 110 performs increased-level detection activity to determine the nearby presence of the user computing device 112, and vice versa.

The system 102 can also provide additional rules that are predicated on the particular configuration shown in FIG. 6. For example, as an additional factor, mode-selecting component 120 can disable the enhanced-rate scanning when it determines that user X 106 or user Y 108 will be delayed to the meeting. This is because a detection event cannot take place unless both user X 106 and user Y 108 are present in the same local space (assuming that the meeting only includes two participants). In another case, the mode-selecting component 120 can disable the enhanced-mode scanning when it determines that users X and Y (106, 108) are separated by more than a prescribed distance. In another case, the mode-selecting component 120 can coordinate detection activity across the user devices (110, 112) when it determines that the user devices (110, 112) are moving together within an environment, e.g., towards a meeting location having its own beacon-emitting mechanism; Subsection A.5 presents one example of this mode of operation.

In yet another example (not shown), any user may move through an environment with two or more user computing devices, such as a smartphone, tablet-type computing device, laptop computing device, wearable computing device, etc. The mode-selecting component 120 can interact with any user computing device using any of the techniques described above. The mode-selecting component 120 can select from among the available user computing devices in the manner described in Subsection A.5.

A.4. The Context-Determining System

FIG. 7 provides additional details regarding one implementation of the context-determination system 140, introduced in FIG. 1. The context-determination system 140 determines context information for storage in one or more data stores 148. The context information refers to information that describes the context of a user's current interaction with an environment. The context information has two general components or aspects. As a first component, the context information describes characteristics that have a direct bearing on the current circumstance of a user, such as the user's current location, state of motion, current spatial relation to other people, etc. As a second component, the context information describes more stable (or deeper) characteristics of the user himself or herself, such as the user's prior activities, habits, preferences, relationships with others, etc.

The context-determining system 140 can collect information from a variety of sources 702. The sources include various sensors provided by the user computing devices. These sensors, in turn, include beacon-sensing mechanisms, accelerometers, magnetometers, gyroscopes, GPS sensors, NFC mechanisms, etc. The sources 702 can also include sensors associated with beacon-processing mechanisms and other sensing equipment placed in an environment.

The context-determining system 140 includes a plurality of subsystems that collect and store different respective types of information. For example, the calendar system 142 stores and maintains calendar information. Each instance of calendar information describes a scheduled event that is to take place in the future, e.g., at a single time or at reoccurring times (e.g., every week at a particular time). The calendar information can describe the start time, ending time, participants, meeting location, etc. of this scheduled event. As stated above, the calendar information can encompass explicit events that users manually define as well as implicit events that the context-determining system 140 infers based on the conduct of the users (in a manner described below). The calendar system 142 stores the calendar information in a data store 704.

The movement-monitoring system 144 detects the movements of users in the manner described above, together with the times at which these movement events occurred. The movement-monitoring system 144 stores movement information in a data store 706. The movement information describes the current positions and motions of the users and the previous positions and motions of the users. In the context of the example of FIGS. 3 and 4, the movement information can also indicate whether there is a possibility that a user computing device can detect a wireless signal emitted by a particular beacon-emitting mechanism (such as the beacon-emitting mechanism 114). For instance, the movement information may indicate that the user 106 is currently in the zone 2 environment 306, in which the user computing device 110 cannot be expected to detect the wireless signal emitted from the beacon-emitting mechanism 114. The movement information that is used to make this decision can originate from one or more sensors, such as a GPS sensor, a beacon-sensing mechanism, etc.

An activity-monitoring system 708 detects and stores activity information. The activity information reflects various activities performed by the users (besides the movement activity captured by the movement-monitoring system 144), and the times at which these activities were performed. For example, the activity-monitoring system 708 can detect and store online actions performed by the users, content items accessed by the users, messages exchanged by the user, etc. The activity-monitoring system 708 stores the activity information in a data store 710.

The movement-monitoring system 144 and the activity-monitoring system 708 can also use any logic to detect habitual activities and to infer preferences. For example, these systems (144, 708) can infer a scheduled event when a user repeats a certain activity at the same general time on more than a predetermined number of occasions within a prescribed timeframe (e.g., as when a user takes lunch at a certain time on most of the workdays of a particular month). In other cases, the systems (144, 708) can apply a machine-learned model, rules-based system, etc. to defined habitual activities.

Other systems provide environment information, stored in a data store 712. The environment information provides map information which describes the environment in which signal detection occurs. The environment information also includes beacon information which describes the locations and beacon codes associated with beacon-emitting mechanisms placed within the environment.

Although not shown, other systems provide user preference information. The user preference information describes the explicit and/or inferred preferences of users. For example, one or more computer-implemented services can store a profile that a user has manually created by himself or herself. This type of profile constitutes explicit preference information associated with that user. In addition, the activity-monitoring system 708 can infer the preferences of the user based on selections that the user repeatedly makes.

Although not shown, other systems provide user contact information. The user contact information describes relationships among users. For example, one or more computer-implemented social network services can provide information regarding the contacts (both explicitly specified and inferred) associated with a particular user.

A relationship-identifying system 714 can more generally identify and memorialize relationships among the various information items described above, to provide relationship information. It does so by identifying higher-level relationships expressed in the information provided by one or more of the above-identified systems (142, 144, 708, etc.). For example, assume that the user frequently has lunch with two work colleagues, which can be reflected by sensor information provided by user computing devices carried by the users, where that sensor information conveys the absolute and/or relative locations of the users. The relationship-identifying system 714 can store relationship information which links each of these users to a particular activity performed at a particular place, with respect to a particular group of people.

The relationship-identifying system 714 can store the relationship information in any format, such as a per-user graph, in a data store 716. A user's graph defines relationships using a collection of nodes linked together with a collection of edges. That is, each node corresponds to an entity (e.g., a user, location, activity, piece of equipment, etc.) and each link describes a detected relationship between two entities. A weight associated with a link can describe the strength of a relationship between two entities connected by that link.

A.5. The Mode-Selecting Component

The mode-selecting component 120 generates activation instructions on a per-user basis. As described above, the activation instructions describe a sensing regimen that is to be used to detect a wireless signal, with respect to a particular user. In one implementation, the probing component 124 of the user's computing device uses the activation instructions to control the rate at which it performs a detection activity at each given time.

The mode-selecting component 120 can express the activation instructions in different ways. For instance, with respect to the example of FIG. 2, the mode-selecting component 120 can communicate the activation instructions to the user computing device 110 by specifying the time span(s) at which heightened detection is to occur, and the manner in which heightened detection is to be performed within those time span(s). Those activation instructions may reflect the application of a single rule which governs the sensing behavior of the user computing device 110 (as in the example of FIG. 2), or the application of two or more rules (as in the example of FIG. 4). In other cases, the mode-selecting component 120 can send activation instructions to the user computing device 110 that specify how it is to perform detection activity within the next x seconds (or within any other interval of time).

The mode-selecting component 120 can update its analysis and provide updated activation instructions on any basis, such as a periodic basis and/or an event-driven basis (e.g., in response to a significant change in the context information). The probe control component 122 controls the detection activity based on a current instance of activation instructions, until that time that it receives updated activation instructions.

The mode-selecting component 120 can generate the activation instructions on a per-user basis in any manner, e.g., using any algorithm, a machine-learned model, a rules-based system, lookup table, etc. First consider the use of a machine-learned model. A machine-learned model receives, as input, a collection of feature values. Each feature value expresses some aspect of the prevailing context in which a decision is to be made. One such item of context information corresponds to the current time of day. Another item of context information describes the current position of the user within an overall environment. Another item of context information indicates whether there are any close-at-hand scheduled events in the user's calendar, and so on. Based on this input information, the machine-trained model can then provide an output result that defines the sensing behavior that is deemed to be most appropriate. In one case, for example, the machine-learned model can provide an output value for each minute (or other interval of time); that output value indicates whether the detection level should be high or low for that particular minute. In other cases, the output value can specify a detection level selected from a set of discrete detection levels or a continuous range of detection levels. The mode-selecting component 120 can forward activation instructions which express the output values of the machine-learned model on any basis, e.g., by providing instructions which reflect the output values on a minute-by-minute basis, or by summarizing the output values and providing instructions which identify those time spans at which heightened detection activity should be performed, etc.

A machine-learned model will learn to make appropriate recommendations based on patterns embodied in a set of training examples that are used to train it. Each training example describes a real-life or hypothetical detection scenario, and can specify: (a) a set of prevailing contextual factors; (b) a sensing regimen that is applied to detect a wireless signal; and (c) an indication of whether the sensing regimen has provided satisfactory results. Item (b), for instance, may indicate whether the detection activity level is high or low. Item (c) constitutes label information and may reflect objective factors and/or subjective factors. With respect to one objective criterion, a regimen can be considered satisfactory when it results in the detection of a wireless signal within n seconds (e.g., 5 seconds) of a user's entrance into a local environment. With respect to one subjective criterion, a regimen can be considered satisfactory when a user subjectively considers it as such. For example, a user who perceives a delay in establishing a connection upon entering a conference room is likely to deem the sensing regimen to be unsatisfactory.

With respect to a rules-based system, the mode-selecting component 120 can apply a collection of IF-THEN rules to determine a sensing regimen. For example, a first rule can describe the sensing behavior in relation to the start time of a scheduled event, such as a meeting. A second rule can describe the sensing behavior in relation to the location of the user. A third rule can describe the sensing behavior in relation to the motion of the user. As a whole, the rules-based system can generate a sensing regimen which best satisfies all applicable rules, e.g., by expressing a sensing regimen which expresses the desired sensing behavior shown in FIG. 4 which depends on the start time of a scheduled meeting, the location of a user, and the motion of the user, etc.

Any rule can also have a priority value associated therewith. The mode-selecting component 120 can take a rule's priority value into consideration in various situations, e.g., as governed by one or more meta-rules. For example, assume that the mode-selecting component 120 determines that two candidate rules apply to a contextual situation, but that only one of the candidate rules should be applied (e.g., because the two candidate rules logically conflict, or because there is some environmental factor which prevents both candidate rules from being applied at the same time, etc.). The mode-selecting component 120 can apply a meta-rule in this situation to select the candidate rule having the highest priority level. Or if the candidate rules have the same priority level, the mode-selecting component 120 can select a candidate rule based on some other factor(s). In one implementation, an expert developer can manually choose the priority levels for the rules. In another implementation, a machine-learned system can learn the priority levels.

More generally, FIG. 8 shows a machine-learning component 802 that operates on a corpus of training examples (in a data store 804) to produce a trained model 806. A mode-selecting component 808 uses the trained model 806 to analyze context information, to provide activation instructions which define a sensing regimen. The machine-learning component 802 can use any machine-learning technique to produce any corresponding machine-trained model, such as by applying, without limitation, any of: a logistic regression technique; a support vector machine technique; a decision tree technique; a clustering technique; a neural network technique; a Bayesian network technique; and so on.

FIG. 9 shows a mode-selecting component 902 that uses a rule-application engine 904 and an associated collection of rules (in a data store 906). The rule-application engine 904 can be implemented using any rule-based technology, such as an engine which applies a collection of IF-THEN rules, an artificial intelligence engine, an expert system, etc. In one case, the rule-application engine 904 identifies one or more IF-THEN rules that apply to a current situation (based on the context information), and applies those rules to generate a particular instance of activation instructions. In the manner described above, the rule-application engine 904 can optionally also select from among applicable rules based on priority levels associated with those rules.

Figure 10:
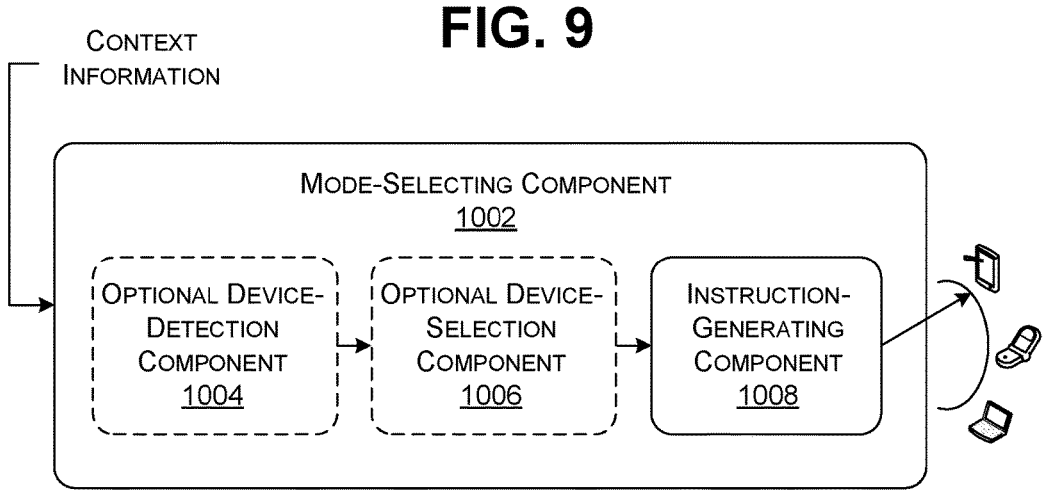
FIG. 10 shows another implementation of the mode-selecting component.

FIG. 10 shows a mode-selecting component 1002 that can provide activation instructions to two or more user computing devices associated with a user, such as the collection 152 of user computing devices introduced in the context of FIG. 1. The mode-selecting component 1002 can include a device-detection component 1004 that detects that a user is carrying two or more user computing devices at a given time. For example, the device-detection component 1004 receives movement information from the movement-monitoring system 144 that indicates the location of all of the user computing devices associated with the user. The device-detection component 1004 can conclude that the user is carrying two or more user computing devices when the movement information indicates that these devices are moving together as a single unit through the environment. In addition, or alternatively, the user can manually confirm that he or she is carrying the collection 152 of user computing devices. In addition, or alternatively, the device-detection component 1004 can base its decision on prior usage information, reflecting the user's prior multi-device usage habits.

A device-selection component 1006 determines which user computing device(s) among the collection 152 is to perform detection activity to detect the wireless signal emitted from the beacon-emitting mechanism 114. The device-selection component 1006 can make this decision based any factor(s), including, but not limited to: (a) the operating status of each user computing device (e.g., indicating whether each user computing device is turned on or off); (b) the amount of available power provided by each user computing device; (c) the type of power provided by each user computing device; (d) the user's specified preferences; (e) the performance of each user computing device (e.g., indicating the signal strength detected by each user computing device); (f) the workload being handled by each user computing device; (g) a power management plan being applied by each user computing device (if any), and so on.

In one scenario, for example, the device-selection component 1006 can select the user computing device having the highest battery level. In another scenario, the device-selection component 1006 can select the user computing device having the most robust signal strength. In another scenario, the device-selection component 1006 can select the user computing device that is performing the least amount of other computing tasks. In another scenario, the device-selection component 1006 can use two or more user computing devices to independently detect the wireless signal based on any of the factors described above. In another scenario, the device-selection component 1006 can dynamically choose from among user computing devices in a round-robin fashion or based on some other selection paradigm. Further note that the device-selection component 1006 can dynamically modify its selection of user computing device(s) based on any environment factor(s). For example, the device-selection component 1006 can stop using a first user computing device and start using a second user computing device when the power level of the first user computing device drops below a prescribed threshold value (and presuming that the power level of the second user computing device is above that level). The device-selection component 1006 can use any technology to make the above-described decisions, such as a machine-learned system, a rules-based system, any equation or algorithm, a lookup table, etc., or combination thereof.

An instruction-generating component 1008 generates activation instructions for each selected user computing device using any strategy described above. The activation instructions govern how a selected user computing device is to perform detection activity.

In yet another scenario, the mode-selecting component 1002 of FIG. 10 can choose among user computing devices associated with two or more users. For example, assume that the calendar system 142 indicates that two users are scheduled to attend a meeting within the next 15 minutes. Further assume that the movement-monitoring system 144 determines that the two users are currently walking together, presumably on the way to the meeting. The movement-monitoring system 144 can draw this co-location conclusion by separately determining the location of each user and/or by determining the location of one user relative to the other user (e.g., using the technique shown in FIG. 6, or a NFC technique, etc.). In addition, or alternatively, the calendar information may reveal that the two users will be traveling together. In this fact situation, the mode-selecting component 1002 can be configured to choose from among the entire pool of user computing devices associated with both of these users. This behavior is based on the premise that it is sufficient for the system 102 to detect when only one of the user computing devices within the pool comes near the conference room; at that time, it can be assumed that both users are about to enter the conference room.

B. Illustrative Processes

Figure 11:
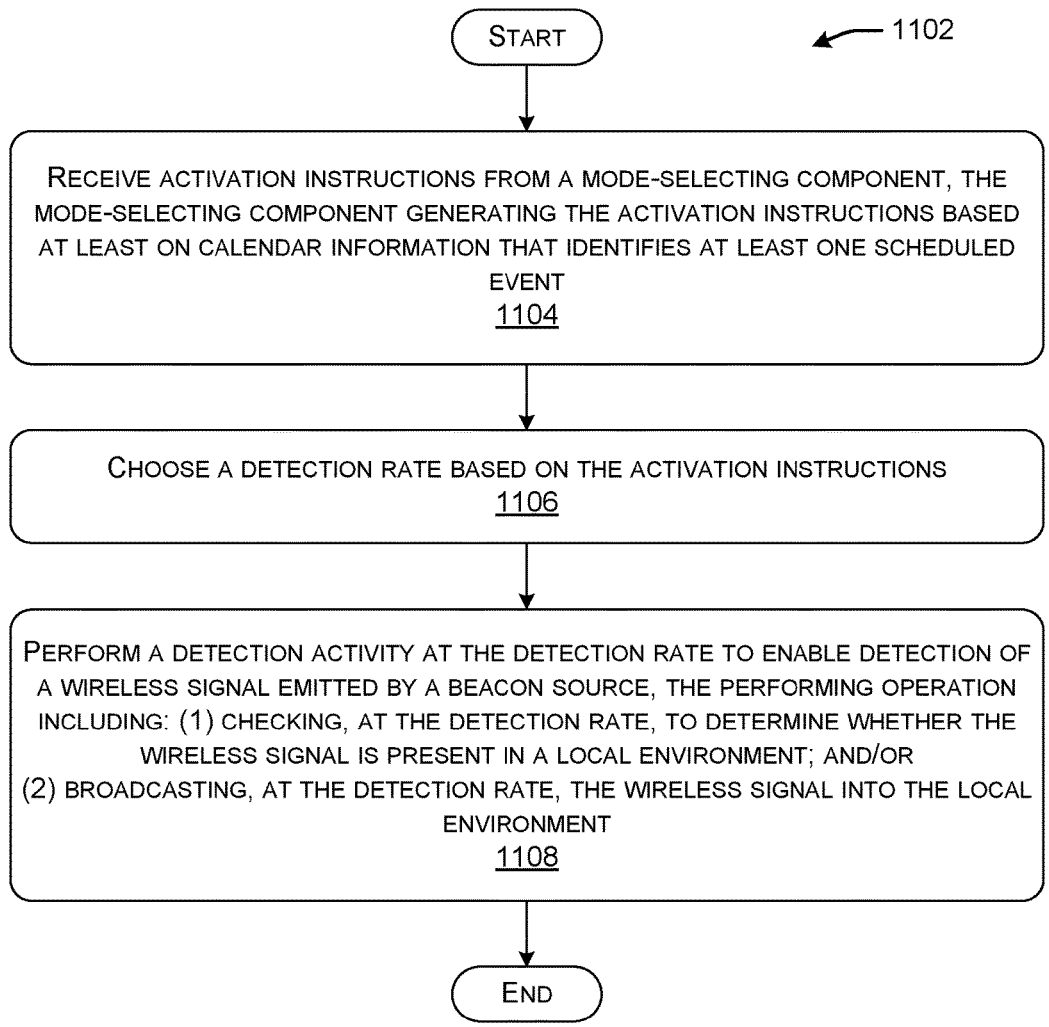
FIG. 11 shows a process that uses activation instructions to govern the rate at which a detection activity is performed.
Figure 12:
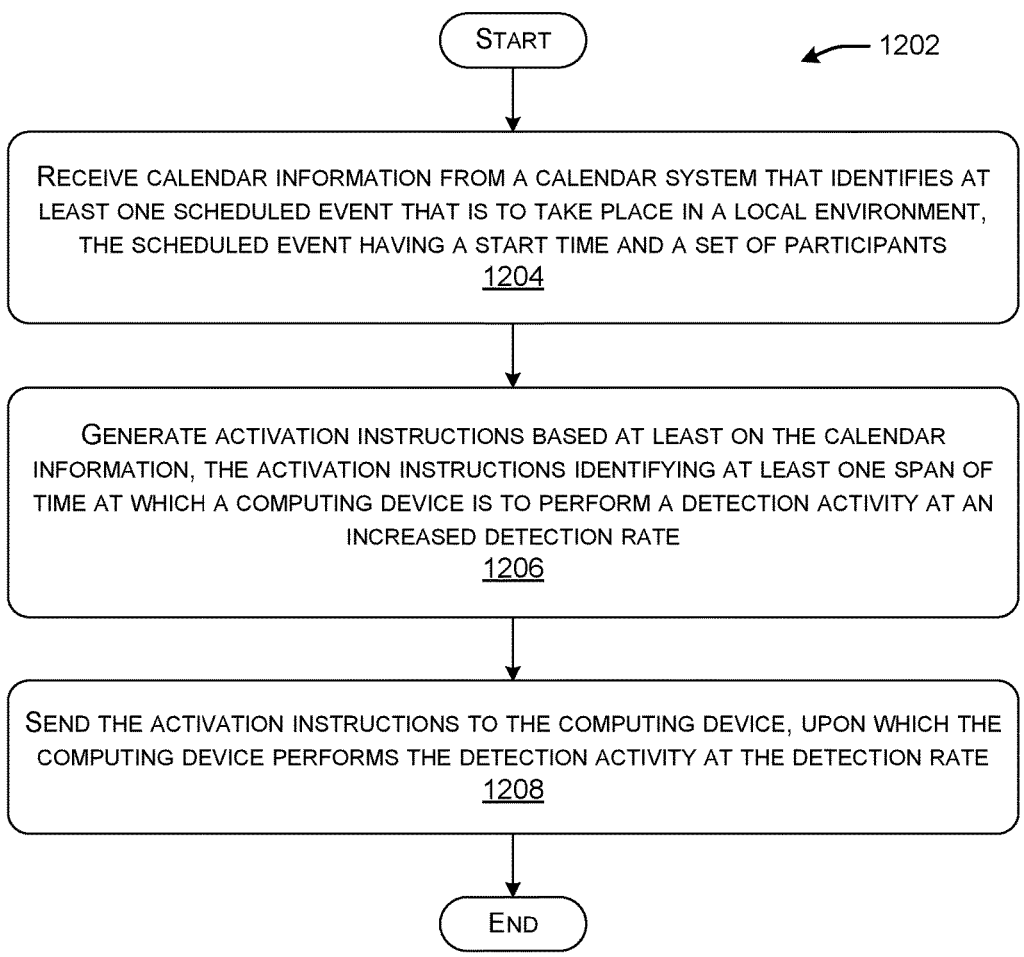
FIG. 12 shows a process for generating the activation instructions referenced in FIG. 11.

FIGS. 11 and 12 show processes (1102, 1202) that explain the operation of the system 102 of Section A in flowchart form. Since the principles underlying the operation of the system 102 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

FIG. 11 shows a process 1002 in which a computing device (such as the user computing device 110 of FIG. 1) uses activation instructions to govern the rate at which it performs a detection activity. In block 1104, the computing device receives activation instructions from the mode-selecting component 120. The mode-selecting component 120 generates the activation instructions, for a particular user, based at least on calendar information that identifies at least one scheduled event. In block 1106, the computing device chooses a detection rate based on the activation instructions for a given point in time. In block 1108, the computing device performs a detection activity at the detection rate to enable detection of a wireless signal emitted by a beacon. The performing operation corresponds to one or more of: checking, at the detection rate, to determine whether the wireless signal is present in the local environment 104;

and/or broadcasting, at the detection rate, the wireless signal into the local environment 104.

FIG. 12 shows a process 1102 by which the mode-selecting component 120 generates the activation instructions referenced in FIG. 11. In block 1204, the mode-selecting component 120 receives calendar information from a calendar system 142 that identifies at least one scheduled event that is to take place in a local environment. The scheduled event has a start time and a set of participants, including a particular participant. In block 1206, the mode-selecting component 120 generates activation instructions associated with the particular user based at least on the calendar information. The activation instructions identify, in some instances, at least one span of time at which a computing device is to perform a detection activity at an increased detection rate. In block 1208, the mode-selecting component 120 sends the activation instructions to a computing device.

C. Representative Computing Functionality

Figure 13:
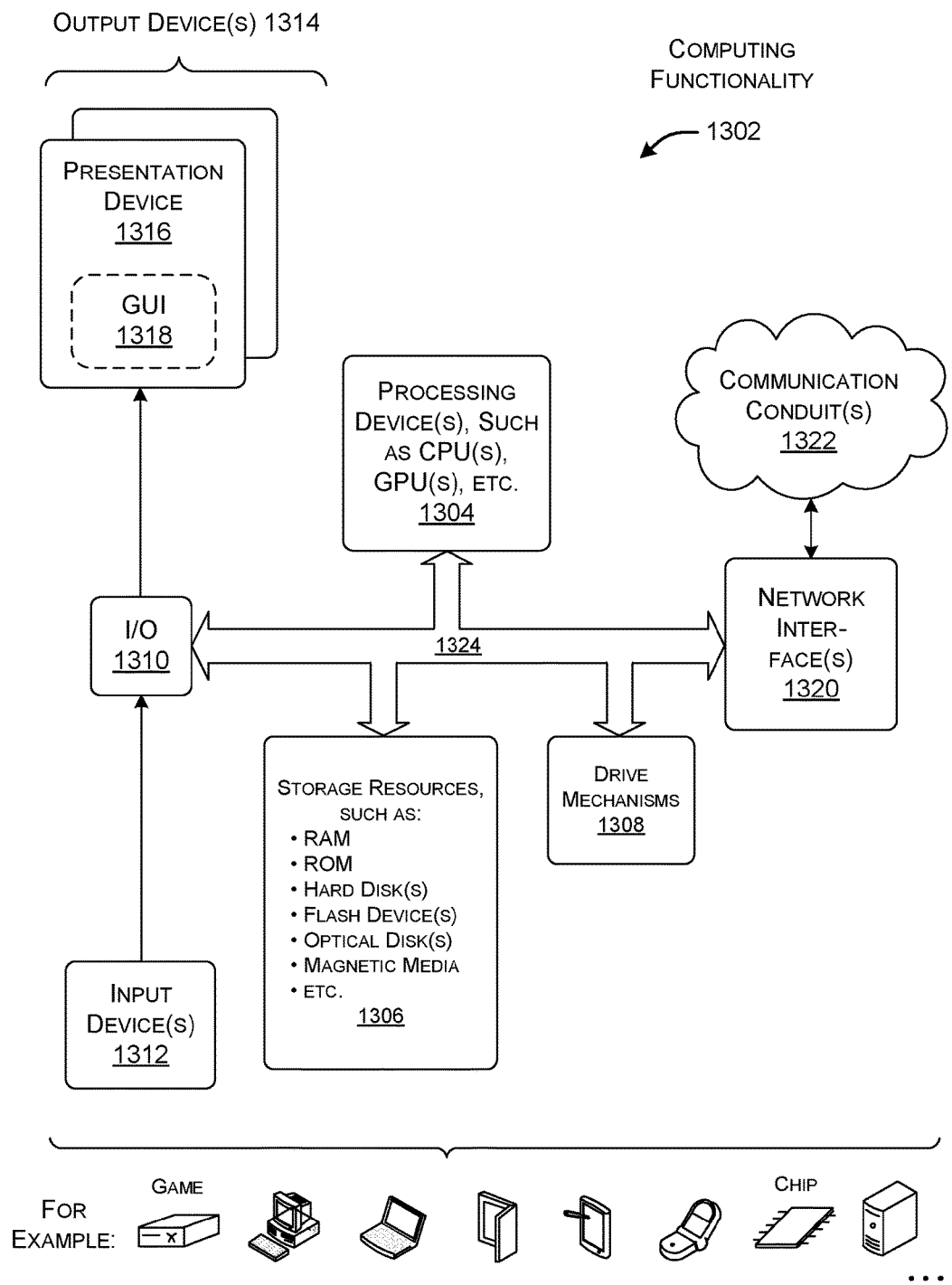
FIG. 13 shows illustrative computing functionality that can be used to implement any aspect of the features shown in the foregoing drawings.

FIG. 13 shows computing functionality 1302 that can be used to implement any aspect of the mechanisms set forth in the above-described figures. For instance, the type of computing functionality 1302 shown in FIG. 13 can be used to implement any of the any aspect of a user computing device (e.g., the user computing device 110 of FIG. 1), a beacon-processing component (e.g., the beacon-processing component 502 of FIG. 5), the mode-selecting component 120, the context-determining system 140, etc. In all cases, the computing functionality 1302 represents one or more physical and tangible processing mechanisms.

The computing functionality 1302 can include one or more hardware processor devices 1304, such as one or more central processing units (CPUs), and/or one or more graphical processing units (GPUs), and so on. The computing functionality 1302 can also include any storage resources (also referred to as computer-readable storage media or computer-readable storage medium devices) 1306 for storing any kind of information, such as machine-readable instructions, settings, data, etc. Without limitation, for instance, the storage resources 1306 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1302. The computing functionality 1302 may perform any of the functions described above when the hardware processor device(s) 1304 carry out computer-readable instructions stored in any storage resource or combination of storage resources. The computing functionality 1302 also includes one or more drive mechanisms 1308 for interacting with any storage resource, such as a hard disk drive mechanism, an optical disk drive mechanism, and so on.

The computing functionality 1302 also includes an input/output component 1310 for receiving various inputs (via input devices 1312), and for providing various outputs (via output devices 1314). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 1316 and an associated graphical user interface presentation (GUI) 1318. The display device 1316 may correspond to a charge-coupled display device, a cathode ray tube device, an electronic ink display device, a projection mechanism, etc. Other output devices include a printer, a model-generating mechanism, a haptic output mechanism, an archival mechanism (for storing output information), and so on. The computing functionality 1302 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area computer network, a wide area computer network (e.g., the Internet), point-to-point connections, etc., or any combination thereof. The communication conduit(s) 1322 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1302 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method, implemented by at least one electronic device, is described for detecting a wireless signal. The method includes: receiving activation instructions from a mode-selecting component. The mode-selecting component generates the activation instructions, for a particular user, based at least on calendar information that identifies at least one scheduled event. The method further includes choosing a detection rate to be applied at a given time based on the activation instructions. The method further includes performing a detection activity at the detection rate to enable detection of a wireless signal emitted by a beacon-emitting mechanism. The performing operation corresponds to one or more of: checking, at the detection rate, to determine whether the wireless signal is present in a local environment; and/or broadcasting, at the detection rate, the wireless signal into the local environment.

According to a second aspect, the performing operation is performed by a user computing device carried by the particular user.

According to a third aspect, the user computing device includes a beacon-sensing mechanism that is configured to check, at the detection rate, for the wireless signal in the local environment. The beacon-emitting mechanism is placed at a predetermined location in the local environment, and broadcasts, at the detection rate, the wireless signal into the local environment.

According to a fourth aspect, the beacon-emitting mechanism is provided by the user computing device and broadcasts, at the detection rate, the wireless signal into the local environment. The local environment includes a beacon-processing component that is configured to detect the wireless signal.

According to a fifth aspect, the user computing device includes a beacon-sensing mechanism that is configured to check, at a first detection rate, for a first wireless signal in the local environment that has been emitted by another user device carried by another user. The user computing device includes a beacon-emitting mechanism that broadcasts, at a second detection rate, a second wireless signal into the local environment for detection by the other user device carried by the other user. Further, the local environment corresponds to a fixed or moving locale that is defined with respect to a spatial relationship between the user computing device and the other user device.

According to a sixth aspect, the user computing device is one of a collection of user computing devices associated with at least the particular user. The method further includes: detecting that the particular user currently has access to the collection of user computing devices; and selecting at least one particular user computing device to receive activation instructions, from among the collection of user computing devices, based on one or more factors.

According to a seventh aspect, the above-mentioned choosing operation entails choosing from among at least two non-zero detection rates, each non-zero detection rate consuming a different respective amount of power from a power source.

According to an eighth aspect, in one particular case, the activation instructions identify at least one span of time at which the detection activity is to be performed at an increased detection rate, relative to a lower detection rate.

According to a ninth aspect, the span of time is chosen in relation to a start time of a scheduled event that the particular user is scheduled to attend.

According to a tenth aspect, the span of time is also based on habit information, the habit information identifying at least one habit of the particular user.

According to an eleventh aspect, the span of time is also based on location information, the location information identifying a location of the particular user with respect to the beacon-emitting mechanism.

According to a twelfth aspect, the span of time is also based on motion information, the motion information indicating whether or not the particular user is advancing towards the beacon-emitting mechanism.

According to a thirteenth aspect, in one particular case, the activation instructions identify at least one span of time at which the detection activity is to be performed at an increased detection rate. The span of time is chosen based on: a start time of a scheduled event that the particular user is scheduled to attend; an indication of whether the particular user is within a prescribed detection zone; and an indication of whether the particular user is in motion.

According to a fourteenth aspect, a computing device is described that includes a communication interface component that is configured to receive activation instructions from a mode-selecting component. The mode-selecting component generates the activation instructions, for a particular user, based at least on calendar information that identifies at least one scheduled event. The computing device also includes a power source, a probe control component that is configured to choose a detection rate to be applied at a given time based on the activation instructions, and a probing component that is configured to perform a detection activity at the detection rate to enable detection of a wireless signal emitted by a beacon-emitting mechanism. The probing component performs the detection activity by: checking, at the detection rate, to determine whether the wireless signal is present in a local environment; and/or broadcasting, at the detection rate, the wireless signal into the local environment. The detection activity consumes an amount of power from the power source that depends on the detection rate.

According to a fifteenth aspect, the probing component includes a beacon-sensing mechanism that is configured to check, at the detection rate, for the wireless signal in the local environment. The beacon-emitting mechanism is placed at a predetermined location in the local environment, and broadcasts, at the detection rate, the wireless signal into the local environment.

According to a sixteenth aspect, the probing component includes the beacon-emitting mechanism. The beacon-emitting mechanism is configured to broadcast, at the detection rate, the wireless signal into the local environment. The local environment includes a beacon-processing component that is configured to detect the wireless signal.

According to a seventeenth aspect, in one particular case, the activation instructions identify at least one span of time at which the detection activity is to be performed at an increased detection rate, relative to a lower detection rate. The span of time is chosen in relation to a start time of a scheduled event that the particular user is scheduled to attend.

According to an eighteenth aspect, the span of time is also based on one or more of: habit information that identifies at least one habit of the particular user; and/or location information that identifies a location of the particular user with respect to the local environment; and/or motion information that indicates whether or not the particular user is advancing towards the local environment.

According to a nineteenth aspect, a system is described for detecting a wireless signal. The system includes a computing device and a mode-selecting component. The mode-selecting component is configured to: receive calendar information from a calendar system that identifies at least one scheduled event that is to take place in a local environment, the scheduled event having a start time and a set of participants, including a particular user; generate activation instructions associated with the particular user based at least on the calendar information, the activation instructions identifying, in one particular case, at least one span of time at which the computing device is to perform a detection activity at an increased detection rate; and send the activation instructions to the computing device. The computing device is configured to receive the activation instructions and to perform the detection activity based on the activation instructions, the detection activity being performed to detect a presence of the particular user within the local environment.

According to a twentieth aspect, the span of time is also based on: an indication of whether the particular user is within a prescribed detection zone; and an indication of whether the particular user is in motion.

A twenty-first aspect corresponds to any combination (e.g., any permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   obtaining activation instructions for a user computing device to perform a wireless signal detection activity, the activation instructions being based at least on calendar information that identifies at least one scheduled event for a particular user of the user computing device;
   choosing a wireless signal detection rate to be applied by the user computing device at a particular time based at least on the activation instructions, wherein the particular time to apply the wireless signal detection rate is based at least on a corresponding time for a particular scheduled event identified by the calendar information; and
   at the particular time, performing the wireless signal detection activity at the wireless signal detection rate to enable detection of a wireless signal,
   said performing comprising one or more of:
      checking, at the wireless signal detection rate, to determine whether the wireless signal is present in a local environment; and/or
      broadcasting, at the wireless signal detection rate, the wireless signal into the local environment.

2. The method of claim 1, wherein the method is performed entirely by the user computing device.

3. The method of claim 2, the performing comprising:
   at the particular time, checking for the wireless signal in the local environment at the wireless signal detection rate,
   wherein the wireless signal is broadcast by a beacon-emitting mechanism is placed at a predetermined location in the local environment.

4. The method of claim 2, the performing comprising:
   at the particular time, broadcasting the wireless signal into the local environment at the wireless signal detection rate,
   wherein the local environment includes a beacon-processing component that is configured to detect the wireless signal.

5. The method of claim 2, the performing comprising:
   checking, at a first wireless signal detection rate, for a first wireless signal in the local environment that has been emitted by another user device; and
   broadcasting, at a second wireless signal detection rate, a second wireless signal into the local environment for detection by the another user device,
   wherein the local environment corresponds to a fixed or moving locale that is defined with respect to a spatial relationship between the user computing device and the another user device.

6. The method of claim 1, wherein the user computing device is one of a collection of user computing devices associated with at least the particular user, and wherein the method further comprises:
   detecting that the particular user currently has access to the collection of user computing devices; and
   selecting the user computing device to receive the activation instructions, from among the collection of user computing devices, based at least on one or more factors.

7. The method of claim 1, wherein the said choosing the wireless signal detection rate comprises choosing from among at least two non-zero wireless signal detection rates, each non-zero wireless signal detection rate consuming a different respective amount of power from a power source of the user computing device.

8. The method of claim 1, wherein, in one particular case, the activation instructions identify the particular time at which the wireless signal detection activity is to be performed at an increased wireless signal detection rate, relative to a current wireless signal detection rate.

9. The method of claim 8, further comprising:
   choosing the particular time to increase the wireless signal detection rate based at least on a start time of the particular scheduled event.

10. The method of claim 9, further comprising:
    choosing the particular time to increase the wireless signal detection rate based at least on habit information identifying at least one habit of the particular user.

11. The method of claim 9, further comprising:
    choosing the particular time to increase the wireless signal detection rate based at least on location information, the location information identifying a location of the particular user with respect to a beacon-emitting mechanism that emits the wireless signal.

12. The method of claim 9, further comprising:
    choosing the particular time to increase the wireless signal detection rate based at least on motion information, the motion information indicating whether or not the particular user is advancing towards a beacon-emitting mechanism that emits the wireless signal.

13. The method of claim 1, further comprising:
    prior to the particular time, performing the wireless signal detection activity at another wireless signal detection rate that is relatively lower than the wireless signal detection rate.

14. A computing device, comprising:
    a communication interface that is configured to receive activation instructions for performing a wireless signal detection activity, the activation instructions being based at least on calendar information that identifies at least one scheduled event;
    a power source;
    a processing device; and
    a storage resource storing machine-readable instructions which, when executed by the processing device, cause the processing device to:
    choose a wireless signal detection rate to be applied at a particular time based at least on the activation instructions, wherein the particular time to apply the wireless signal detection rate is based at least on a corresponding time for a particular scheduled event identified by the calendar information; and
    at the particular time, perform the wireless signal detection activity at the wireless signal detection rate to enable detection of a wireless beacon signal, the wireless signal detection activity being performed by:

checking, at the wireless signal detection rate, to determine whether the wireless beacon signal is present in a local environment; and/or broadcasting, at the wireless signal detection rate, the wireless beacon signal into the local environment, wherein the wireless signal detection activity consumes an amount of power from the power source that depends on the wireless signal detection rate.

15. The computing device of claim 14, wherein:

the wireless beacon signal is broadcast by a beacon-emitting mechanism that is placed at a predetermined location in the local environment, and the wireless signal detection activity includes checking to determine whether the wireless beacon signal is present in the local environment.

16. The computing device of claim 14, further comprising:

a beacon-emitting mechanism that is configured to broadcast, at the wireless signal detection rate, the wireless beacon signal into the local environment, wherein the local environment includes a beacon-processing component that is configured to detect the wireless beacon signal.

17. The computing device of claim 14, wherein, in one particular case, the activation instructions identify the particular time at which the wireless signal detection activity is to be performed at the wireless signal detection rate, and the wireless signal detection rate is increased relative to a lower wireless signal detection rate at which the wireless signal detection activity is performed prior to the particular time.

18. The computing device of claim 17, wherein the particular time is also based at least on one or more of:

habit information that identifies at least one habit of a particular user that is scheduled to attend the particular scheduled event; and/or location information that identifies a location of the particular user with respect to the local environment; and/or motion information that indicates whether or not the particular user is advancing towards the local environment.

19. A system comprising:

a processing device; and a storage resource storing machine-readable instructions which, when executed by the processing device, cause the processing device to:

receive calendar information from a calendar system that identifies a particular scheduled event that is to take place in a local environment, the particular scheduled event having a start time and a set of participants, including a particular user;

generate wireless detection activation instructions based at least on the calendar information, the wireless detection activation instructions identifying a particular time at which a computing device is to increase frequency of a wireless signal detection activity from a first non-zero detection rate to second, increased non-zero detection rate, the particular time being based at least on the start time of the particular scheduled event; and send the wireless detection activation instructions to the computing device.

20. The system of claim 19, wherein machine-readable instructions, when executed by the processing device, cause the processing device to:

select the particular time based at least on:

an indication of whether the particular user is within a prescribed detection zone; and an indication of whether the particular user is in motion.

21. A method comprising:

accessing calendar information that identifies at least one scheduled event for a particular user;

based at least on the calendar information identifying the at least one scheduled event, generating wireless detection activation instructions that specify a particular time at which to perform a wireless signal detection activity in a particular manner, the particular time being based at least on a corresponding time for a particular scheduled event identified by the calendar information; and providing the wireless detection activation instructions to a user computing device associated with the particular user, wherein the wireless signal detection activity comprises one or more of:

checking to determine whether a wireless signal is present in a local environment; and/or broadcasting the wireless signal into the local environment.

* * * * *